(12) United States Patent
Seshadri et al.

(10) Patent No.: US 7,631,296 B2
(45) Date of Patent: Dec. 8, 2009

(54) RULES FRAMEWORK FOR DEFINITION AND EXECUTION OF END-USER RULES LOGIC

(75) Inventors: Praveen Seshadri, Bellevue, WA (US); Holly Knight, Woodinville, WA (US); Robert H Gerber, Bellevue, WA (US); Stephen E Dossick, Redmond, WA (US); Vincent H Curley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 10/903,765

(22) Filed: Jul. 30, 2004

(65) Prior Publication Data

US 2005/0246686 A1 Nov. 3, 2005

Related U.S. Application Data

(60) Provisional application No. 60/567,165, filed on Apr. 30, 2004, provisional application No. 60/567,149, filed on Apr. 30, 2004, provisional application No. 60/567,153, filed on Apr. 30, 2004.

(51) Int. Cl.
   *G06F 9/44* (2006.01)
   *G06F 3/00* (2006.01)
(52) U.S. Cl. .................. 717/117; 719/320; 719/328; 715/744
(58) Field of Classification Search .............. 717/117
   See application file for complete search history.

(56) References Cited

U.S. PATENT DOCUMENTS

| | | | |
|---|---|---|---|
| 5,446,885 A | 8/1995 | Moore et al. | |
| 5,495,603 A | 2/1996 | Fruchtman et al. | |
| 5,630,127 A | 5/1997 | Moore et al. | |
| 5,917,489 A | 6/1999 | Thurlow et al. | |
| 6,142,684 A | 11/2000 | Kirshenbaum et al. | |
| 6,272,521 B1 | 8/2001 | Jablonski et al. | |
| 6,292,937 B1 | 9/2001 | Sakata et al. | |
| 6,341,369 B1 * | 1/2002 | Degenaro et al. | 717/117 |

(Continued)

OTHER PUBLICATIONS

G. Kapel, B. Proll, S. Rausch-Schott, and W. Retschitzegger. TriGSflow—Active ObjectOriented Workflow Management System. In Proc. of the 28th Hawaii International Conference on System Sciences, pp. 727-736, 1995.

(Continued)

*Primary Examiner*—Michael J Yigdall
(74) *Attorney, Agent, or Firm*—Workman Nydegger

(57) ABSTRACT

A rules-based software architecture that provides the infrastructure for the definition and execution of end-user rules logic. This enables end-user automation of data in a unified storage platform using simple IF-THEN rules. The architecture includes a monitoring component that tracks items associated with the data, and a rules component interfaces to the rules component, and employs metadata associated with the tracked items to provide for automated handling of a subset of the items. The system further provides for defining virtual collections and items in the system using content based logic. The system further comprises one or more trigger components that sets items and collections of items dynamically active as a function of trigger logic. Additional components can include a constraint component for imposing constraint logic on items, and a decision component that supports enabling application customization logic at decision points.

8 Claims, 18 Drawing Sheets

U.S. PATENT DOCUMENTS

| | | | |
|---|---|---|---|
| 6,407,753 | B1 | 6/2002 | Budinsky et al. |
| 6,519,597 | B1 | 2/2003 | Cheng et al. |
| 6,633,889 | B2 | 10/2003 | Dessloch et al. |
| 6,636,845 | B2 | 10/2003 | Chau et al. |
| 6,643,633 | B2 | 11/2003 | Chau et al. |
| 6,965,889 | B2 | 11/2005 | Serrano-Morales et al. |
| 6,976,020 | B2 | 12/2005 | Anthony et al. |
| 2004/0143604 | A1 | 7/2004 | Glenner et al. |
| 2004/0193575 | A1 | 9/2004 | Chen et al. |
| 2004/0216086 | A1 | 10/2004 | Bau |
| 2005/0060281 | A1* | 3/2005 | Bucher et al. .................. 707/1 |
| 2005/0222996 | A1* | 10/2005 | Yalamanchi .................. 707/4 |
| 2005/0246686 | A1 | 11/2005 | Seshadri |

OTHER PUBLICATIONS

B. Grosof and T. Poon. Representing Agent Contracts with Exceptions using XML Rules, Ontologies, and Process Descriptions. In Rule Markup Languages for Business Rules on the Semantic Web, Jun. 2002. 22 pages.

F. Hayes-Roth. Rule-based Systems. Communications of the ACM, vol. 28 Issue 9, pp. 921-932, 1985.

J. Eisenstein and A. Puerta. Adaptation in Automated User-interface Design. Proceedings of the 5th International Conference on Intelligent User Interfaces, pp. 74-81, 2000.

Thomas Rizzo, WinFS 101: Introducing the New Windows File System, http://msdn.microsoft.com/library/en-us/dnwinfs/html/winfs03112004.asp?frame=true, Mar. 17, 2004, 5 pages, Last viewed on Aug. 23, 2004.

Shawn Wildermuth, A Developer's Perspective on WinFS: Part 1, http://msdn.microsoft.com/library/en-us/dnlong/html/winfsdevpersp.asp?frame=true, Mar. 2004, 12 pages, Last viewed on Aug. 23, 2004.

U.S. Appl. No. 10/903,762, filed Jul. 30, 2004, Holly Knight et al.

Buchi, et al., "Compound Types for Java", Aug. 1998, ACM, pp. 362-373.

XDuce: A Typed XML Processing Language, Last Viewed on Aug. 19, 2004, 1 page, http://xduce.sourceforge.net/.

Y. Leontiev, M.T. Ozsu, and D. Szafron, On Type Systems for Object-Oriented Database Programming Languages, ACM Computing Surveys, vol. 34 Issue 4, pp. 409-449, 2002.

XQuery 1.0: An XML Query Language, W3C, Last Viewed on Aug. 19, 2004, 270 pages, http://www.w3.org/TR/xquery/.

The Xtatic Project: Native XML Processing for C#, Last Viewed on Aug. 19, 2004, 2 pages, http://www.cis.upenn.edu/~bcpierce/xtatic/.

Brian Yeh. Exporting Software and the Extraterritorial Reach of U.S. Patent Law: *Microsoft Corp.* v. *AT&T Corp*. CRS Report for Congress. May 31, 2007. Order Code RS22670.

Chamberlin, XQuery: An XML query language; Aug. 16, 2002; pp. 597-615.

International Search Report for PCT Application No. US04/24719 dated Sep. 21, 2007, 3 pgs.

International Search Report and Written Opinion for PCT application No. PCT/US504/25060, dated: May 28, 2008, 4 pgs.

* cited by examiner

GENERAL RULE FORMAT

ON(each data item)/IF(conditions are true)/THEN(conclusions)

FIG. 9A

ACTIVE LOGIC RULE FORMAT

ON(each data item)/IF(conditions are true)/THEN(actions)

FIG. 9B

APPLICATION CUSTOMIZATION RULE FORMAT

ON(each data item)/IF(conditions are true)/THEN(results)

FIG. 9C

DATA DERIVATION RULE FORMAT

ON(each data item)/IF(conditions are true)/THEN(include/exclude)

FIG. 9D

DATA CONSTRAINTS RULE FORMAT

ON(each data item)/IF(conditions are true)/THEN(allow/disallow)

FIG. 9E

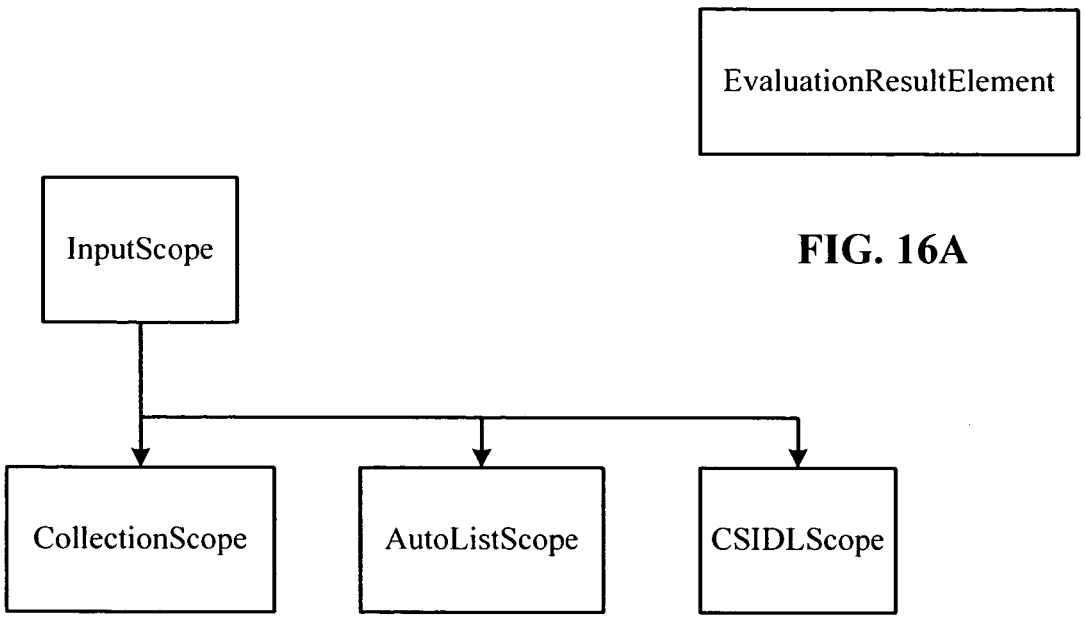
FIG. 16A
FIG. 16B
FIG. 16C
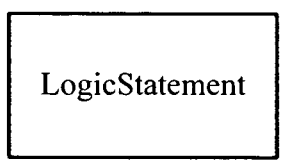
FIG. 16D
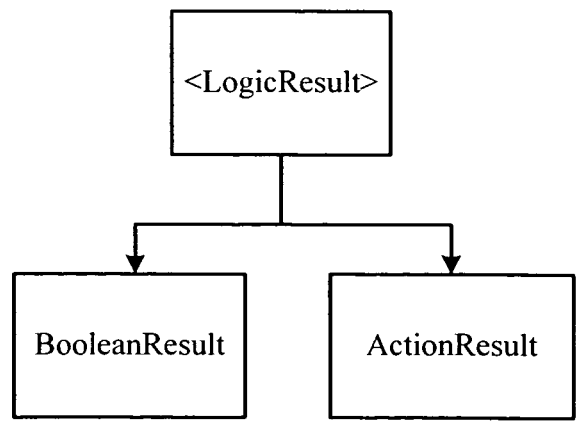
FIG. 16E

RULES FRAMEWORK FOR DEFINITION AND EXECUTION OF END-USER RULES LOGIC

CROSS-REFERENCE TO RELATED APPLICATIONS

This application claims the benefit of U.S. Provisional Patent Application Ser. No. 60/567,165, entitled "RULES FRAMEWORK FOR DEFINITION AND EXECUTION OF END-USER RULES LOGIC", filed on Apr. 30, 2004, U.S. Provisional Patent Application Ser. No. 60/567,149 entitled "DERIVED SET—A RULES-BASED QUERY-LIKE MECHANISM THAT DEFINES CONTENTS OF A COLLECTION" and filed Apr. 30, 2004, and U.S. Provisional Patent Application Ser. No. 60/567,153 entitled "END-USER APPLICATION CUSTOMIZATION USING RULES", filed on Apr. 30, 2004. This application is also related to co-pending U.S. patent application Ser. No. 10/903,762 entitled "END-USER APPLICATION CUSTOMIZATION USING RULES" filed on Jul. 30, 2004. The entireties of the above-noted applications are incorporated herein by reference.

TECHNICAL FIELD

This invention is related to a rules-based software architecture that facilitates end-user automation of data.

BACKGROUND OF THE INVENTION

Computers and computing have always divided the world of users into two classes: the knowledgeable "high priests" who know how to use computers in complex ways, to shape programs and enable behaviors that are valuable and rich; and the novice users, who are at their mercy, denied easy or cheap access to knowledge or information or the education to make computers serve their needs well. However, major breakthroughs in computing have occurred when technology has broken down some of these barriers to access.

In the world of the mainframe, computers were too expensive for all but the largest businesses to afford. The advent of mini-computers, and then personal computers (PCs), broke down the cost barrier and made computers available to small businesses and individuals.

In the 1980's, programmers struggled to build graphical user interface (GUI) applications, and without rich and consistent GUIs, were unable to build valuable applications for PC users. The Visual Basic revolution and the use of controls and event-based GUI construction enabled a whole army of application developers who could easily build rich applications. This also established a virtuous cycle with many more end-users who could exploit these applications.

In the 1990's, end-users struggled to overcome a lack of access to information. The growth of the Internet and the web transformed this space, making almost all valuable information accessible to anyone with a browser. However, there are still significant barriers to overcome.

Computing is not personal. There is very little about a PC that is truly "personal". The data on the local disk is personal. But the behavior of the machine (what it does on behalf of the user) is close to identical across millions of users. Despite owning an amazingly powerful general purpose computer, the average user treats it as a static tool, useful as a communication end-point, useful as a search entry-point, useful to execute some canned mass-market applications, but otherwise incapable of any "personal computing" in the true sense of the word. The personalization capabilities available in current applications just scratch the surface of what is possible and desirable.

Computing is manual. Consider the daily routine of most typical computer end-users. The PC gathers information, reacts to communications, makes decisions and acts upon them—initiates or responds to communications, organizes information, buys and sells goods, travel, etc. Computers have improved communication between people, and have improved access to information. However, PCs have done little to relieve the end-user's responsibility to make decisions and act upon them at the right time. In the business world, there are decision support systems for major organizational decisions. Still software does not help the average PC user in the many everyday, yet important and personal decisions.

Computing is not contextual. Computer software typically provides optional settings that are rather static and unrelated to the actual context of the user (e.g., "Why should I have the same set of messaging buddies at work and at home?").

Thus, users are still in the "pre-industrial age" of software by being increasingly trapped in the tyranny of manual information processing—spending hours every day sifting, sorting, searching, and reacting to email, documents and other personal data.

End-user software should be personalized, aware of the needs and preferences of the end-user, and acting specifically in a manner guided by those needs and by the user context. Further, computer systems and software should provide every end-user with a personal executive assistant who works 24 hours a day gathering and sifting information of interest to the end-user, and reacting to that information.

The most valuable class of end-user computing activity deals with information flows and search, such as ensuring the end-user sees relevant information (e.g., "Tell me if there is a school closing due to bad weather."), enhancing person-to-person communication with personalized behavior (e.g., "If I'm out of the office when my wife calls, let her know when I'll be back."), ensuring important information is not lost (e.g., "If there's an urgent email, make sure it gets forwarded to me on my mobile device."), and automating the management of information (e.g., "As new photographs arrive, place them in the right folders and shares based on their timestamp, GPS location, and any relevant calendar entries.").

The way to accomplish this is by allowing the end-user to "program" the behavior of their computer. However, traditional programming languages are clearly not the answer, in that, the end-user is not (and cannot become) a trained developer.

Thus, there is an unmet need for an improved programming platform that facilitates automation of this manual process thereby allowing users to personalize computers and software to automatically act on his or her behalf.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The focus of the invention is on data and information, the central value in storage and communication, and on the end-user, who is typically a naïve non-developer (consumers, knowledge workers and business users) who nonetheless want to make their PC and their applications behave in a customized and automated manner.

The present invention disclosed and claimed herein, in one aspect thereof, comprises a rules-based software architecture that provides the infrastructure for the definition and execution of end-user defined rules logic that automates data.

The rules creation framework consists of items and relationships used when creating rules and when building applications that use rules. These items and relationships are used by a rules engine of the rules framework to determine what the computer should do in response to specific events. To customize application behavior based on end-user rules the programmer "rule enables" functions of the software and end users create rules for those functions.

The present invention allows an end-user to define logic that "automates" the end-user data in at least the following four ways: data derivation, triggered activation, data constraints, and decision points. Data derivation rules are attached to an input item scope. Triggered activation rules are attached to items that change in a collection. Data constraint rules are attached to items that change in a collection. Data-driven decision rules are explicitly applied to items by applications. A unified rules storage platform brings together all of the knowledge worker applications around a theme of schematized data in a common store.

A rule is the single declarative IF-THEN programming construct for complex logic. Every end-user logic component is defined as a rule. All other constructs are simple binary algebraic operators. A rule defines a declarative side-effect-free function over an input argument of a specific item type.

The rules creation framework uses item types to support rule creation: a decision-point item, a rule item, and a rule set attachment item. Denoted a RuleSetAttachment, it represents a connection between a decision point (denoted DecisionPoint) and rule (denoted Rule) items. These connections can be modeled either as physical, stored "Links", or as computed "common value associations". In either case, the function is the same—the connection from a Rule to the DecisionPoint for which it was created. Each rule-enabled feature of an application is defined by a decision point item. End users create rules for specific decision points, and the application submits data to the rule engine using decision point objects. Each condition/result statement is a rule item. A rule is the unit of logic for execution. A rule can be a multistatement. Users create rules. Rules organization can be controlled by the user, but it may also be controlled by applications or the visual browsing metaphor presented to the user. Applications can also create rules. A rule is associated with a decision point via a rule set attachment (RSA) item. This attachment is used by the rules engine to determine which rules should be executed for a given input.

The rules platform evaluates an end-user rules using a database query processor. This leads to efficient evaluation while the semantics remains consistent with the rest of the platform.

Since the end-user is typically not a trained developer, it is not reasonable to expect to program in a traditional programming language. Rather, schematized logic building blocks are provided, so that end-users can program by stitching them together in simple yet rich combinations. Empirical evidence from existing applications suggests that end-users can be comfortable defining decision logic using IF-THEN rules. Thus, the rules-based platform of the present invention enables end-user automation of data in a unified storage platform using simple IF-THEN rules. This further supports a host of applications that employ query builders that involve Boolean conditions.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 9A illustrates a general format of a rule in accordance with the present invention.

FIG. 9B illustrates a general rules format for active rules in accordance with the present invention.

FIG. 9C illustrates a general rules format for application customization rules in accordance with the present invention.

FIG. 9D illustrates a general rules format for data derivation rules in accordance with the present invention.

FIG. 9E illustrates a general rules format for data constraints rules in accordance with the present invention.

FIG. 16A shows the EvaluationResultElement nested type of the present invention.

FIG. 16B shows an InputScope nested type of the present invention and its derivations.

FIG. 16C shows the LogicConstraint nested type of the present invention. LogicConstraint is used both by RuleLogic (and children) and DecisionPoints.

FIG. 16D shows the LogicStatement nested type of the present invention. LogicStatements encode a condition tree and a set of results (actions or Boolean).

FIG. 16E shows the LogicResult nested type of the present invention and its derivations.

DETAILED DESCRIPTION OF THE INVENTION

Figure 1:
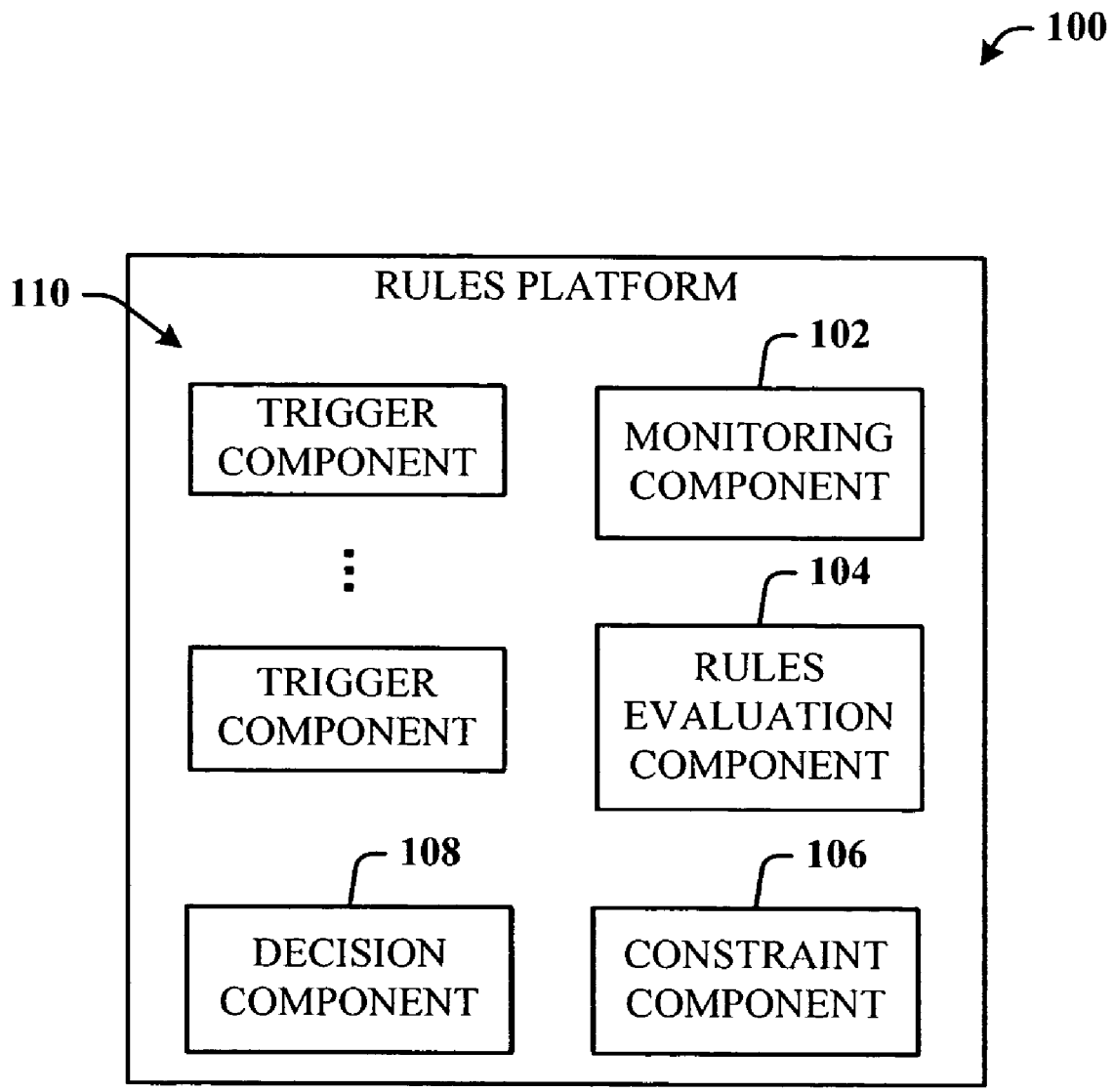
FIG. 1 illustrates a system that facilitates end-user data automation and management in accordance with the rule architecture of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Rules Platform

A file system is a repository for end-user data. The present invention allows an end-user to define logic that "automates" the end-user data in at least the following four ways: data derivation, triggered activation, data constraints, and decision points. A unified rules storage platform brings together all of the knowledge worker applications around a theme of schematized data in a common store. It is about finding, organizing, and reacting to data. Rich querying and rich rules are two sides of the same coin. Rich querying and views give the end-user increased control when finding data. Rich rules provide increased automation of data organization, as well as, the capability to build active/reactive behaviors into the system. These are capabilities that today's PC user is starting to expect on individual applications. One feature is to standardize these capabilities across all data and applications.

The rules-based architecture of the present invention facilitates schematization, data sharing, and information management. An ubiquitous common schematization of data is central to the development of end-user "programs". Sharing data is common and natural for an end-user program. When deciding to prioritize an arriving email message, the calendar entries for the day, the people and groups one participates in, the current location of the user (all schematized data created by different applications) are naturally pulled together to make decisions. The disclosed architecture enables sharing of data across applications. An important aspect of the present invention is the capability to manage information overload through organization (folders/lists) and relationships. In most information overload situations, the problem is not merely having rich folders and categorization, but also having the time to manually organize/categorize the data. If the system automates the use of rich organization constructs, they become truly valuable to end-users.

The rules creation framework consists of items and relationships used when creating rules and when building applications that use rules. These items and relationships are used by the rule engine of the Rules platform to determine what the computer should do in response to specific events.

To customize application behavior based on end-user rules, two things happen. The programmer "rule enables" functions of the software and end users create rules for those functions. For example, rule-enabling operating system features are included so that users can define rules on items such as folders and documents. This supports rules "programs" written by end-users that represent the behavior they desire from their computers. Moreover, this behavior should migrate with them as they travel. Since the disclosed rules architecture models rules as data, the data can be synchronized and migrated.

A rule is the single declarative programming construct for complex logic. Every end-user logic component is defined as a rule. All other constructs are simple binary algebraic operators. A rule defines a declarative side-effect-free function over an input argument of a specific item type. A rule has two parts—a signature (that defines the input item type and the output type) and a definition. In general, the output type can be a simple scalar type, an item type, or a collection type (reflecting the expectation of a set of results).

A rule is expressed logically as acting on a single input, though during evaluation, it is often applied to a set of actual inputs. As a running example, consider a rule defined against the Message item type. The Message type is the source of a relationship type, Recipient, the target of which is the Contact item type. This captures the information in the "To" field of a mail message. To explain the examples, an English-like pseudo-language is used to describe rules. This should not be mistaken to represent an actual rules language—rather, rules are expressed in code using API constructs, and by the end-user using friendly UI manipulations with meaningful user-friendly descriptions.

The rule definition is an ordered list of zero or more IF-THEN statements. Each IF-THEN statement within a rule has a condition expression (the IF part) and a result expression list (the THEN part). The condition expression is a Boolean expression tree, the leaves of which are basic condition operators that an end-user can reason about. The result is a list of expressions that are constants or simple expressions that an end-user can reason about.

The semantics of a rule with multiple IF-THEN statements is defined in terms of the output for a particular input item. If there are no statements whose conditions evaluate to true on the input item, then the result is NULL. If there is exactly one statement whose conditions evaluate to true, then the output is defined by the results of that statement. If there are multiple statements whose conditions evaluate to true, then the result depends on the application of a conflict resolution policy to the results of all these statements. A common conflict resolution policy is based on the order of the statements in the rule, that is, the highest priority wins.

The rules creation framework uses item types to support rule creation: a decision-point item, a rule item, and a rule set attachment item (also denoted RuleSetAtachment, or RSA). Each rule-enabled feature of an application is defined by a decision point item. End users create rules for specific decision points, and the application submits data to the rule engine using decision point objects. Each condition/result statement is a Rule statement item. Rules are the unit of logic for execution. Applications can also create rules. An application can provide a default rule as a starting point. This default rule will be used as the decision point until the end-user chooses to modify or provide an alternate rule. A rule is associated with a decision point via the RSA item. This attachment is used by the rules engine to determine which rules should be executed for a given input.

It can be possible to define conditions that join/combine with other data collections. Further, it is possible to specify componentized logic including virtual collections that can be used in other rules.

For asynchronous behavior rules, the results describe actions that are methods on a file system type, on any CLR type or any static method. For synchronous behavior rules, the results are a set of values of application-specific types, e.g., a filename, a string, an object to be evaluated, one of an enumerated list of colors.

The rules platform includes a standard rich rules user interface (UI). The principles followed are: there is a common UI for both rules and views/queries; the entire authoring process can occur within a single screen; a uniform abstraction for templates is supported; value selection can support rich type-specific controls (e.g., a date picker); and the UI can be extensible—when new item types are added, it can automatically become possible to author rules against them and involving their conditions and actions. For operating system rules, the user attaches the rule to a decision point in via a UI action with the visual browsing metaphor. However, other applications can create the attachment for the user because the application defines the decision point for the user.

Referring now to FIG. 1, there is illustrated a system 100 that facilitates end-user data automation and management in accordance with the rule architecture of the present invention. The rules architecture allows an end-user to define logic that "automates data" in the following four ways. First, data derivation facilitates defining "virtual" collections and items from other items in the system using content-based logic. For example, defining a group of contacts called People WhoLiveInBellevue which is a subset of the overall set of Contacts who have addresses in Bellevue. Second, triggered activation of side-effecting Logic facilitates making collections and items active by associating them with trigger logic. For example, by declaring that any new documents being added to the Specifications collection should lead to their authors being notified by email. Third, data constraints facilitate imposing constraint logic on items. For example, by requiring that any email in the Indigo folder have "Indigo" in the subject or have been sent to the Indigo mailing list. Finally, data-driven decision facilitates supporting rich application customization logic at application interceptor points. For example, by specifying which signature file should be attached to an outgoing mail message, based on the content and destination of the message.

In support thereof, the system 100 includes a monitoring component 102 that tracks items associated with the data. A rules evaluation component 104 employs metadata associated with the tracked items to provide for automated handling of a subset of the items. The system further facilitates defining virtual collections and items in the system using content based logic. The system further comprises one or more trigger components 106 that sets items and collections of items dynamically active as a function of trigger logic. Additional components can include a constraint component 106 for imposing constraint logic on items, and a decision component 108 that supports enabling application customization logic at decision points. The decision component 108 represents not only the one or more decision points that can be exposed by an application, but also an API that submits events or the decision points.

Figure 2:
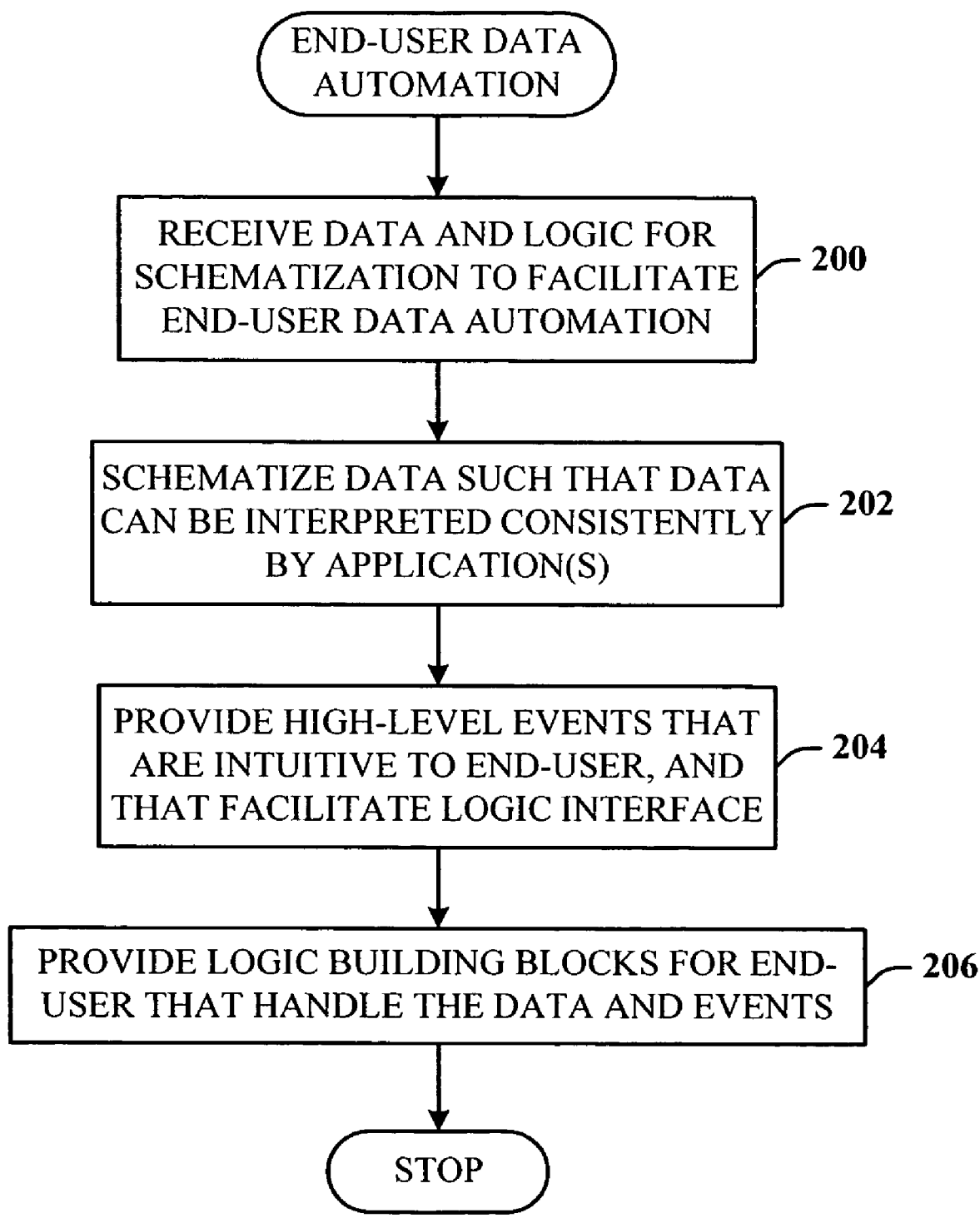
FIG. 2 illustrates one methodology of schematization in accordance with the rules architecture of the present invention.

Referring now to FIG. 2, there is illustrated one methodology of schematization in accordance with the rules architecture of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Schematization is defined as the structuring of data and logic into well-known and defined patterns that enable multiple applications to recognize and interact with the data and logic. An ubiquitous common schematization of data is central to the development of end-user "programs." At least three "schematizations" enable end-user data automation in accordance with the present invention. At 200, data and logic is received for schematization to facilitate end-user data automation. At 202, the data is schematized. Schematized information is the data that is the basis for end-user applications (e.g., email, people, groups, and locations). This allows consistent interpretation of data by applications. At 204, events are schematized for logic building blocks. Schematized information events are the events that provide the hooks to attach logic. These events are high-level and tied to information flows that make sense to the end-user. For example, the arrival of an email message is such an event. Events can be synchronous interceptor points within applications, or asynchronous events to which logic can be bound. At 206, logic building blocks are schematized to handle the data (or information) and events via rules. Since the end-user is typically not a trained developer, it is not reasonable to expect to program in a traditional programming language. Rather, schematized logic building blocks are provided, so that end-users can program by stitching them together in simple yet rich combinations.

Figure 3:
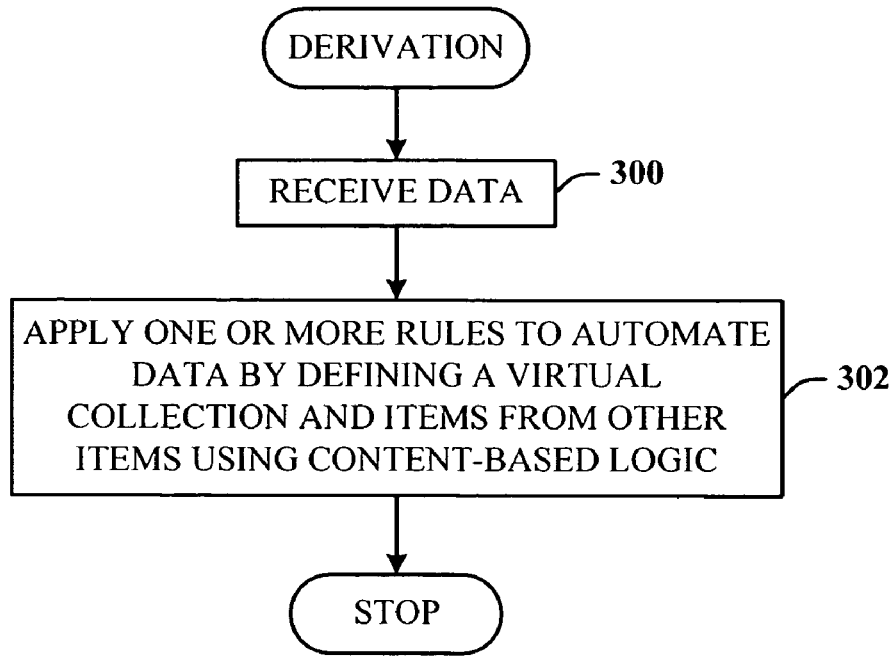
FIG. 3 illustrates one methodology of data derivation in accordance with the rules architecture of the present invention.

Referring now to FIG. 3, there is illustrated one methodology of data derivation in accordance with the rules architecture of the present invention. At 300, data is received for processing. At 302, one or more rules of the rules architecture are applied to automate the data by defining "virtual" collections and items from other items in the system using content-based logic. For example, a virtual collection can be created by defining a group of contacts called PeopleWhoLiveInCity which is a subset of the overall set of Contacts who have addresses in the City.

Figure 4:
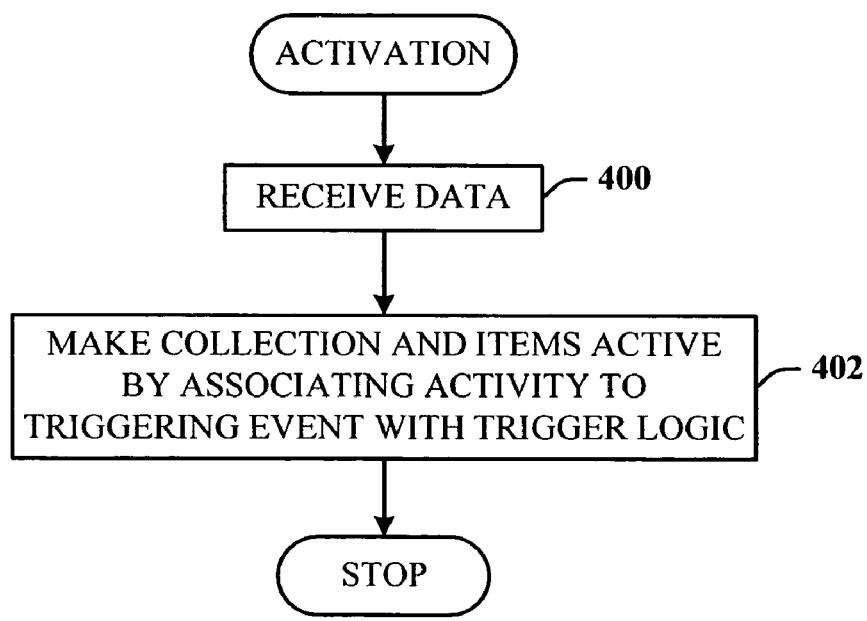
FIG. 4 illustrates one methodology of triggered activation of side-effecting logic in accordance with the rules architecture of the present invention.

Referring now to FIG. 4, there is illustrated one methodology of triggered activation of side-effecting logic in accordance with the rules architecture of the present invention. At 400, data is received for processing. At 402, collections and items are made active by associating an activity to the triggering event with trigger logic. For example, declaring that any new documents being added to a Specifications collection can lead to their authors being notified by email.

Figure 5:
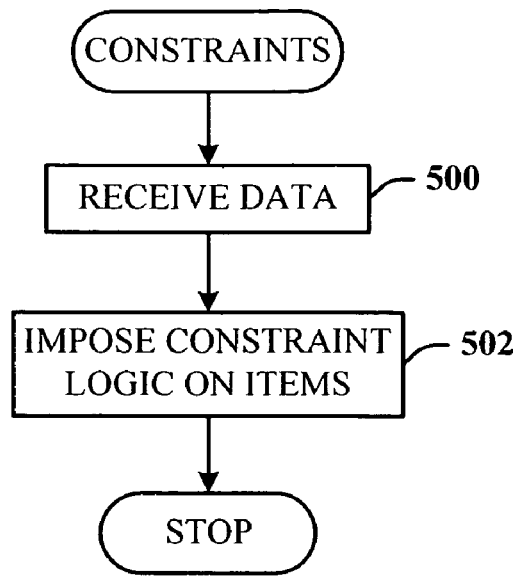
FIG. 5 illustrates one methodology of data constraints in accordance with the rules architecture of the present invention.

Referring now to FIG. 5, there is illustrated one methodology of data constraints in accordance with the rules architecture of the present invention. At 500, data is received for processing. At 502, constraint logic is imposed on items. Requiring that any e-mail in a Name folder have "Name" in the subject or have been sent to the Name mailing list is one example of a data constraint.

Figure 6:
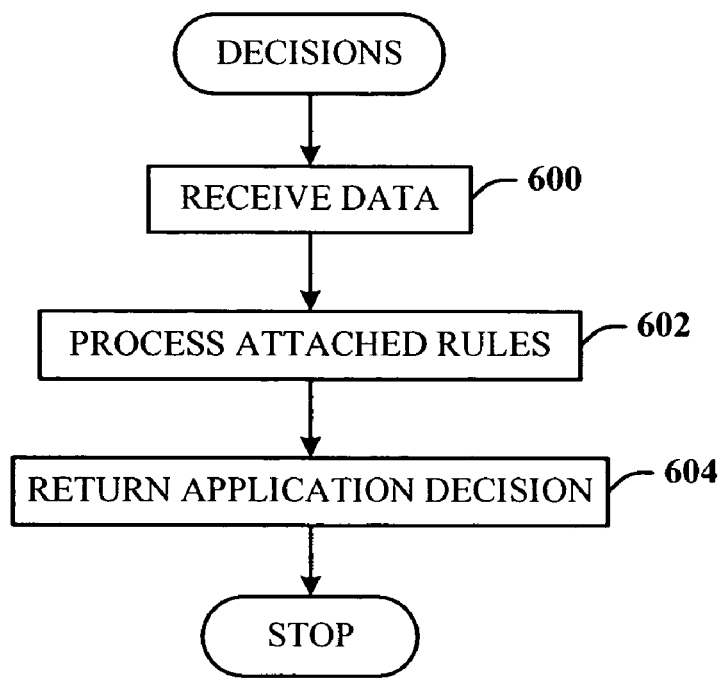
FIG. 6 illustrates one methodology of providing application customization at a decision point in accordance with the rules architecture of the present invention.

Referring now to FIG. 6, there is illustrated one methodology of providing application customization at a decision point in accordance with the rules architecture of the present invention. At 600, data is received for processing at a decision point. Rich customization logic is provided at application interceptor (or decision) points. Thus, at 602, rules attached to the decision point are processed. Specifying which signature file should be attached to an outgoing mail message, based on the content and destination of the message, is one example of a data-driven decision point. At 604, the application decision is returned.

Figure 7:
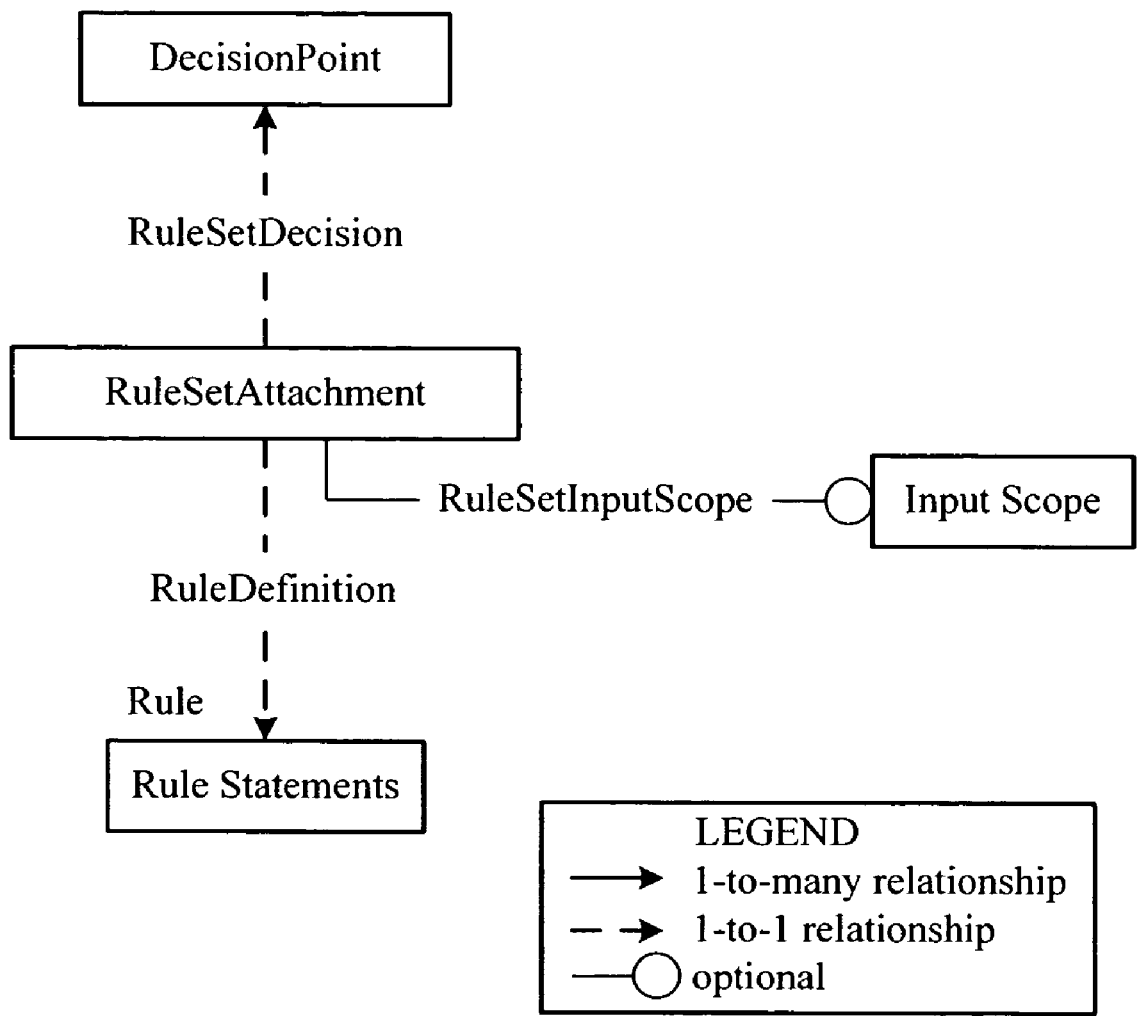
FIG. 7 illustrates a diagram of item types and their relationships of the rules architecture of the present invention.

Referring now to FIG. 7, there is illustrated a diagram of item types and their relationships of the rules architecture of the present invention. The input scope is any item of any type. Input scopes are used by the operating system to limit the scope of rule evaluation to a specific item or folder, but are typically not used by individual applications. The labels on the lines in the above graphic show the names of the relationships between items. The RuleSetAttachment item represents a connection between the DecisionPoint and Rule items. These connections can be modeled either as physical, stored "Links", or as computed "common value associations". In either case, the function is the same—the connection from a Rule to the DecisionPoint for which is was created. Decision point items enable an application to use the rules platform. Rules describe rule items, including constraints, conditions, and results. Rules contain rule statements. Rules are attached to a decision point, and the application provides input to the decision point to return results.

Figure 8:
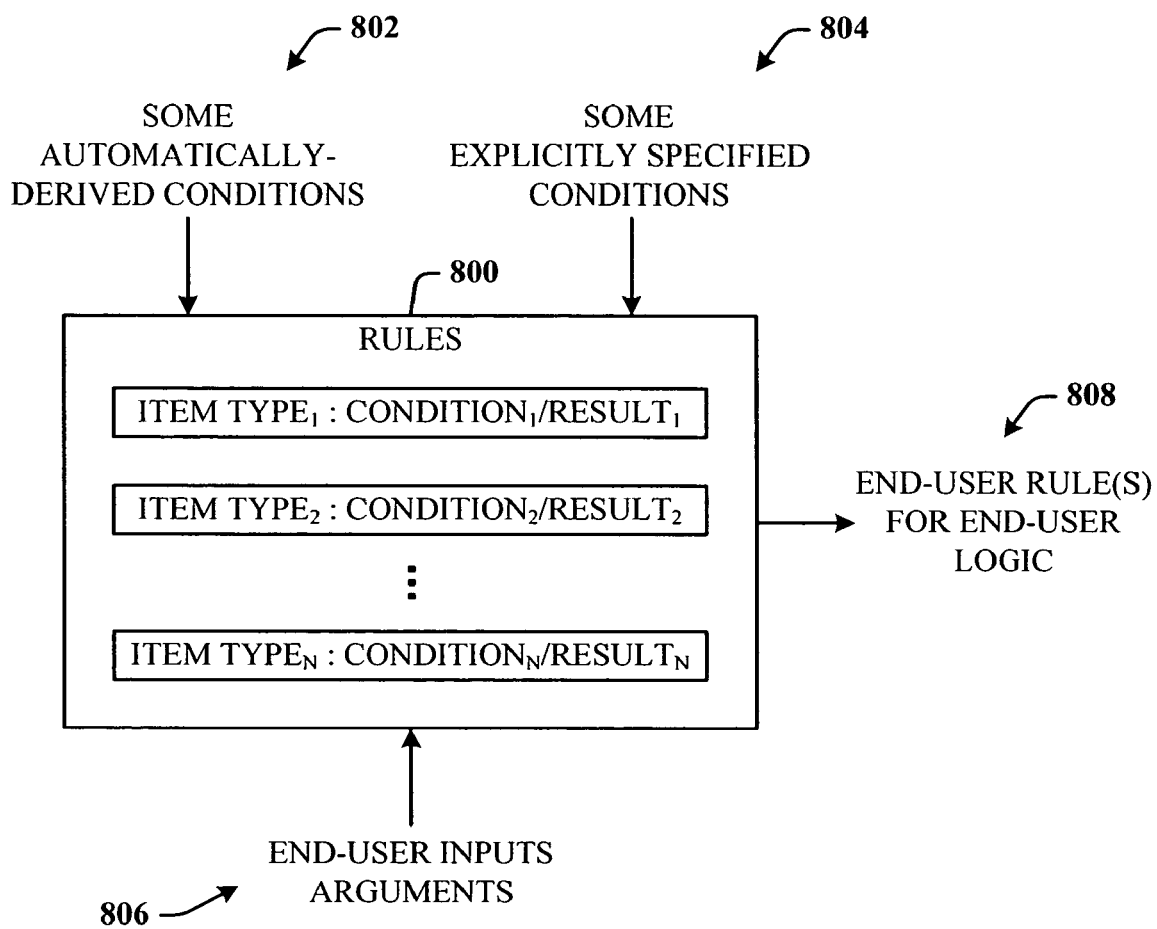
FIG. 8 illustrates a diagram of conditions and results processing in accordance with the rules architecture of the present invention.

Referring now to FIG. 8, there is illustrated a diagram of conditions and results processing in accordance with the rules architecture of the present invention. The rules platform provides the infrastructure for the definition and execution of end-user rule logic. The rules schema provides parameterized conditions and results associated with item types. For example, the EmailMessage item type may have conditions IsFrom, IsTo, etc., associated with it. There is provided a full set of item types 800 for the rules platform that are available to facilitate end-user programming in accordance with the present invention. The item types 800 are denoted ITEM TYPE$_1$: CONDITION$_1$/RESULT$_1$, ITEM TYPE$_2$: CONDITION$_2$/RESULT$_2$, . . . , ITEM TYPE$_N$: CONDITION$_N$/RESULT$_N$. As an input 802, some of the simpler conditions are automatically derived from the item type, whereas other conditions 804 can be explicitly specified by the developer. The user inputs argument values 806 to the item types 800. These conditions and results of the selected item types 800 become the output "instruction set" 808 for end-user logic. The conditions and results in a rule are instances of the developer-defined conditions and results, with argument values specified by the end-user. Each rule is persisted as an item, with all the sharing, security and synchronization capabilities of an item.

An end-user logic "program", the output instruction set 808, is a set of rules, which is a set of rule statements. A complete unit of logic includes one or more rules. Each rule is a unit of authoring. Note that the input to the rule is a data item. The rule is a declarative statement about an item of a particular item type. As an extension to the basic model, non-item data (transient data or XML) can be provided as a rule input. The items to which the rules apply depends on the deployment of the rules. The rule is the unit of deployable end-user logic. The rule is deployed by attaching it to an item scope (a source of item inputs or decision points). This association is captured as the RuleSetAttachment. Rules, and RuleSetAttachments (RSAs) may be an item (it may, as described earlier, be a named common value relationship between items).

In the case of active rules, an item scope is an item collection. When rules are used to intercept and customize applications, the application provides the item against which the rule is applied.

The rules collectively defines an end-user customization request. Each Rule statement within the rule corresponds to one statement of end-user intent. If multiple rules can be applied, a conflict resolver can be applied over the actions.

Referring now to FIG. 9A-E, there are illustrated representative formats of rules in accordance with the rules architecture of the present invention. From an end-user perspective, Rules=Views=Queries. The rules platform follows at least these principles: rules are declarative IF-THEN expressions; the data model for rules is the data model, and consequently, any item type can participate in rules; and, rules are evaluated within the database query processor against the data model.

A view is a persisted query, but does not differ from queries in expressive power. In fact, views and rules share a common requirement of persistence.

While this explanation of commonality makes sense for filter queries, it clearly is not true for full-blown SQL queries that utilize richer semantics (e.g., aggregation). Such queries are relevant for developers to use in applications. Those queries have commonality with richer rules systems.

End-user queries are typically simple filters. Interestingly, this class of filter queries is also what is provided by an OPath language.

FIG. 9A illustrates a general format of a rule in accordance with the present invention. A rule is simply a set of statements of the form ON (each data item) IF (conditions are true) THEN (conclusions). It can be used to express decisions, truths, and in general, a variety of declarative statements. A query is a restricted form of a rule where the conclusions of the rule are limited to inclusion of the item in the result (in general, the exclusion of an item is also a possible conclusion). A declarative statement that defines the content of the result of a query is the following: ON (each data item) IF (conditions are true) THEN (include the item in the query result). Indeed, this is how queries are modeled in the relational calculus, based on which the SQL language was initially modeled. In the case of active rules, the conclusions of a rule are interpreted as side-effecting actions to be executed.

Different evaluation algorithms are possible, since rules are declarative. Low latency algorithms are appropriate for a client machine, while high throughput algorithms are appropriate for a server. Rules are persisted as items, leading to standard behavior in the areas of security, sharing, and synchronization.

The conditions of a rule are a Boolean expression combining basic predicates defined by the input item type. Common comparison conditions against item properties, as well as advanced condition methods defined by the schema developer are supported. The first principle is that conditions in end-user rules and conditions in end-user queries should be identical in terms of expressive power and, ease and metaphor of expression. A second principle is that end-user views should be composable with other rules/queries/views. This allows rich end-user logic to be built through composable building blocks. It is noted that it is possible to express conditions across relationships and spanning data collections (in database parlance a "join", but presented in a meaningful stylized fashion to the average end-user).

The results of a rule are simply data. When rules are used for application customization, they need to be interpreted by the consuming application. In the case of activation rules (these provide event-triggered behavior with side-effecting actions), the results correspond to actions to be performed. The rules platform provides a hosting service in which these actions are executed.

A rule item is an item that includes a set of relationships (e.g., 'contains' rule items). The logical behavior of a rules is defined on a single input item of a specific type. Rules are applied to input items.

The primary kinds of programming constructs in databases are triggers, stored procedures (sprocs), views/queries, and constraints. Likewise, end-user programming in accordance with the present invention has active rules (triggers), customization rules (sprocs), derivation rules (views), and constraint rules (constraints).

FIG. 9B illustrates a general rules format for active rules in accordance with the present invention. Active rules are used in any scenario where the computer needs to perform an action on behalf of the user, including, for example: automatically organizing photographs being downloaded from a camera; processing, filtering and forwarding incoming email, phone calls and IM; notifying the user of relevant alerts; and simple ad-hoc "workflows" defined by the end-user.

Active logic is defined by rules of the form ON (item) IF (conditions) THEN (actions). The results in the THEN clause correspond to executable actions chosen from a set of basic verbs available with the storage system (e.g., Move and Add) or defined by the storage schema developer. The advanced developer can define specialized schemas or schema extensions in order to define conditions and actions for end-user rules.

There are two ways in which an active rule can be attached to an item scope. Firstly, the active rule can be attached to an item collection with periodic semantics. The rule is periodically applied to each item and the appropriate actions (after any conflicts are resolved) occur. Secondly, the active rule can be attached to an item collection with eventing semantics. Whenever changes occur in the item collection, the rule is executed against the changed item.

FIG. 9C illustrates a general rules format for application customization rules in accordance with the present invention. The behavior of applications today is not very customizable. Typically, any customization is based on simple option settings. Instead, rules allow end-users to customize applications at various interceptor points with data-driven logic based on the current application and user context. Customization rules can be used by any application that wants to provide points for end-user control. One way to think of this is—every value that is settable through the Tools→Options pane of the application should be definable not just as a constant but through decision logic. For example, rules to determine which signature file to apply to an outgoing mail message, whether to interrupt the user with an alert, etc.

Application customization rules are of the form ON (item) IF (conditions) THEN (results). The application provides an item or set of items as inputs. The results do not actually get automatically executed as part of rule evaluation—rather, they are simply returned as the results of rule execution for the application to interpret appropriately.

FIG. 9D illustrates a general rules format for data derivation rules in accordance with the present invention. End-users can define rules to define sets of items using content-based filters. These is called derived itemsets. The operating system visual browsing metphor has a notion of Dynamic Sets that captures a closely related idea. All end-user queries and views fall into this category.

Derivation rules are of the form: ON (item) IF (conditions) THEN (include/exclude). Note that the only results allowed are include and exclude. A rule is deployed by attaching it to an item scope. The resulting derived ItemSet contains those items in the source set that are "included" by the rule. Effectively, these derivation rules define a rich filter on an item scope.

Some examples of derived ItemSets are the following: a group of people called MyFriends, defined as Contacts who have non-null home phone numbers, and Contacts who are not marked as business contacts; and a set of e-mail called InBoxMailFromMyFriends, defined as any e-mail in the InBox from anyone in MyFriends.

Note that the definitions of derived itemsets are composable—InBoxMailFromMyFriends uses the definition of MyFriends. This composability is critical in order for end-users to build modular definitions. Modular definitions of derived itemsets also make other kinds of rules more expressive. For example, an active rule on the InBox may indicate that if the sender is in MyFriends, then the mail should be marked "personal".

FIG. 9E illustrates a general rules format for data constraints rules in accordance with the present invention. End-users are also able to specify constraints on an item collection using rules of the form ON(item) IF (conditions) THEN (allow/disallow). Constraint rules are attached to an existing item collection (this is the item scope for the rules) and are activated by changes (insert/update/delete) to the item collection. The activation is synchronous with the changes. There are multiple possible behaviors on failure (if the rule result is "disallow"): the changes (typically item additions) themselves can fail. And alternatively, the item being added to the collection can be modified to conform to the constraints.

Each rule is associated with a rule constraint that specifies the type of the rule inputs, the allowed conditions, and the allowed rule results. For example, rules used to define a derived item set or in querying constrain their results to be either an include or an exclude of the input item. End users do not deal with rule constraints. It is an application and developer concept, constraining the logic that an end-user can specify in the context of a particular decision. A RuleConstraint type is used to describe these constraints.

It might be observed that constraint rules and derivation rules are very similar. The difference, however, is that constraint rules only specify a necessary condition for membership in a collection. They do not specify how the collection should be populated (in other words, there is no domain of items against which rule logic is applied).

End-User Programming (EUP) Model

Traditionally, much of the design work for file systems has been based on an understanding of end-user requirements in the area of "manual" interactions, e.g., copy semantics, lifetime management, etc. These requirements have been captured and inserted into the core file system data model and APIs. However, the full requirements for end-user interaction with the file system data are broader than "manual" interaction, by involving richer and more dynamic interaction, with data manipulation being programmed by the end-user.

The design of EUP is based on four central principles related to the thinking of the end-user as the principal driver of requirements:

Compositional Logic. Complex logic is constructed using smaller compositional units with simpler structure. All end-user programs are declarative. An end-user program is constructed by the composition of logic components. There is an EUP Algebra that defines how logic components can be put together. Each logic component is a fragment of logic of which the end-user can make sense. Whether the logic component is used to define queries, or to define complex verbs or constraints, it is defined using a common IF-THEN rule construct. In addition to a common logical model, it also permits a common visual presentation of rule logic across applications.

Manage programs as data. Every EUP program and every EUP logic component is represented as a file system item. From the end-user's point of view, a complex action or filter they have defined is no different from a document they have edited. It is a piece of data from the point of view of sharing, synchronization, backup, security, etc. A useful side-effect is that the API surface to interact with EUP concepts is the standard API surface to interact with any data item.

End-User Flexibility. It is all about giving power and flexibility to the end-user. For example, an end-user can define a new end-user type, dynamically modify existing types, define and persist queries, define "business logic" that affects specific items, etc. These are described at the appropriate level of abstraction that is declarative, algebraic and rule-based.

Common model across applications. The work an end-user does in one application or in a visual browsing metaphor presented to the user can be carried over into other applications. For example, if an end-user property is set up for the Document type in the metaphor, the end-user can expect to be able to use that property when defining queries against a document in some other part of the metaphor or in another file system application.

There are five basic aspects to the EUP of data: data types, logic, queries and views, verbs and automation, decisions, and constraints. Data types include type mappings and property mapping. Type mappings involve the data types that an end-user can see and about which the user can reason, and how the types map to the file system. Property mapping involve the properties that the user sees associated with an end-user data type and how these map to the underlying storage types.

Logic involves queries, automation, constraints, and application customization. A programming model defines end-user logic, and an authoring model defines how the end-user can define complex logic. End-user logic persistence is provided, and management describes how end-user logic is shared and managed, and the mechanism for naming, sharing, synchronizing, etc.

Queries and views provides an expressive model that describes the right filtering and querying abstractions to present to an end-user, for example. Behavior considers what the expected behavior should be when an end-user drags an item onto or from an auto-list (e.g., auto-lists behaving like lists). With respect to presentation abstractions, there is a set of logical information associated with the presentation of an auto-list to the end-user (e.g., projection properties, sort order, pagination), and also some physical information (page dimensions, etc).

Verbs and automation describes what are end-user "verbs" are in terms of the underlying data model, how new complex conditional verbs be constructed by the end-user, how the application of verbs to items can be applied to a set of items together, and richer verbs, and how the application of verbs can be automated.

Decisions describe how application customization decisions (defined by end-user customization rules) are modeled.

Constraints describe how the end-user can define constraints on the content of an item/itemset, and enforceable semantics.

There are five basic terms in the end-user programming (EUP) algebra.

Property(T): This describes a property of an end-user type T. The user uses properties to describe filters and actions.

Filter(T): This defines a Boolean function that can be used as a filter over items of type T. It is a rule whose return type is Boolean.

Event(T): This defines an occurrence of interest. It is typically associated with a data item (the event data) whose type is T.

Action(T): This is a side-effecting method of the item type T, and typically requires other parameters.

Set(T): This is a set of items of type T.

Instances of each of these terms are derived from the item schemas defined in the system by developers. In the case of Set(T), the instances of this term are any of the collections in the file system. However, instances of each these terms can also be constructed by the end-user via simple algebraic constructors or via rules. The following basic terms can be constructed using rules:

Property(T): A rule whose input item type is T and output type is O defines a property of type O over type T.

Filter(T): A rule whose input item type is T and output type is Boolean defines a filter over items of type T.

Action(T): A rule whose input item type is T and output type defines an action over items of type T.

Within each rule, a variety of conditions can be used including the following: <property> <comparison operator> <expression>, <existing filter>, ANY/EVERY <relationship target> MATCHES <filter>, and ANY/EVERY <relationship target> IN <set>. These conditions show different kinds of composition that can occur within a Rule. This also includes aggregations, which is a count of the items in a set. The following terms can be constructed using simple binary algebraic operations: Event(T)=Event(T)+Filter(T), wherea derived event is defined by the application of a filter to the event data of another event, e.g., NewInterestingItem(Doc)=NewItem(Doc)+IsInteresting(Doc); Filter(T)=Filter1(TSubType1) Union Filter2(T_SubType2); Set(T)=Set1(T)+Filter(T), wherea derived set is defined by the application of a filter to each of the items in another set; the derived set members are those items for which the filter evaluates true; and Set(T)=Set1(T) Union Set2(T).

Individual EUP logic components can be evaluated directly within an application. This is the approach used for application customization (e.g., for an application like Outlook to allow the end-user to customize the behavior of the application via end-user logic). The central element of EUP is surfaced through the environment visual browsing methphor and involves the following three kinds of programs:

Derived Set: A derived set (described earlier as an algebraic term) is itself a complete end-user program. When it is opened, the logic of the set definition is executed and the results are typically displayed. The following algebraic operations are also supported for derived sets, Set(T)=Set1 (T) Union Set2(T).

Batch: Batch=Set(T)+Action(T). A batch defines a set-oriented task to perform. The semantics of a batch is to execute the action on each item in the set. It can be manually executed or scheduled for execution.

Agent: Agent=Event(T)+Action(T). An agent defines an action to perform when an event occurs.

All three kinds of EUP programs are defined as file system items, as well as logic components.

Further algebraic operations can be included. For example, it is feasible to consider a variety of set-combination operations (intersection, set-difference, etc.) to define derived sets.

A RuleLogic item defines a unit of end-user logic. Query-Filters, complex verbs, complex events, and computed properties are instances of RuleLogic. Logically, a RuleLogic item captures the definition of a user-defined function over an input item. Every RuleLogic item contains a RuleConstraint, which defines the input item type and the output type of the function. There are zero or more IF-THEN statements. Each statement has a Condition (corresponding to the IF part of the statement) and a Result (corresponding to the THEN part). The Condition is a Boolean expression tree of nested elements, and at the leaves of the tree are LeafCondition elements. The Result is a nested element collection of zero or more ResultElements, each with a name and a set of parameter values. In the case of QueryFilters, the Result of a statement is a single ResultElement with the name True or False, and with no parameters.

The semantics of any RuleLogic definition (and hence also a QueryFilter) is briefly described herein. If the QueryFilter has no statements, the output is NULL. If the QueryFilter has one statement, then the output is true if the Condition evaluates to true and the Result is True. The output is false if the Condition evaluates to true and the Result is False. The output is NULL otherwise. If the QueryFilter has multiple statements, then the output is computed using an aggregate function over the Results of those statements whose Conditions evaluate to true. The most common aggregate function is based on statement order (providing a nested if-then-else or switch statement semantics).

Figure 10:
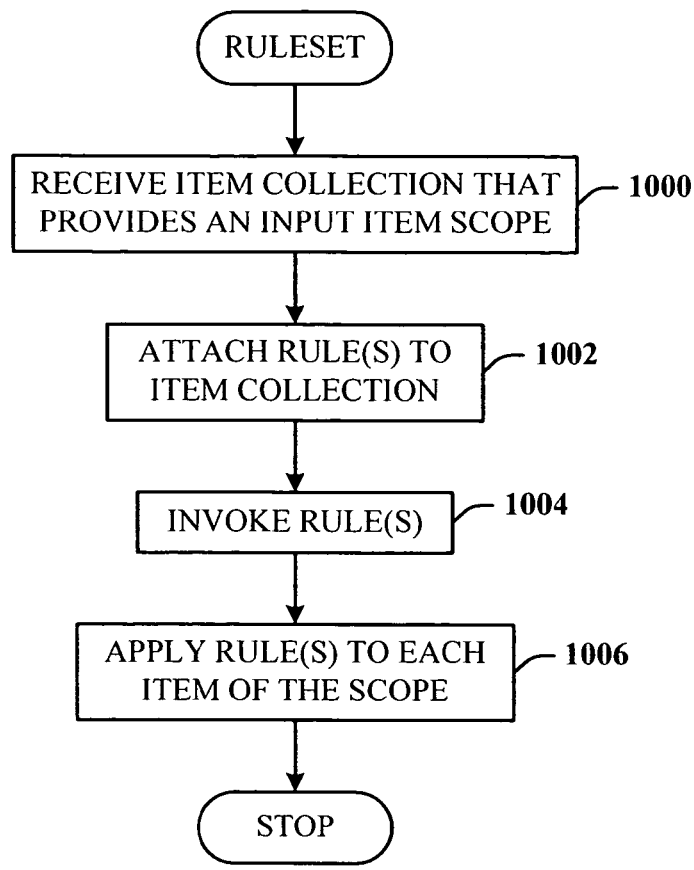
FIG. 10 illustrates one methodology of applying rules by attaching the rules to a collection of input items in accordance with the rules architecture of the present invention.

Referring now to FIG. 10, there is illustrated one methodology of applying a rule by attachment to a collection of input items in accordance with the rules architecture of the present invention. The term "collection" refers to any set of item references (called a set in shell terminology, and a multi-set of relationships in rules terminology). At 1000, an item collection is received that provides an input item scope. At 1002, the rule can be attached to the item collection that provides the input item scope. At 1004, the rule is invoked. At 1006, when invoked, the rule is applied to each of the items in the item scope.

Figure 11:
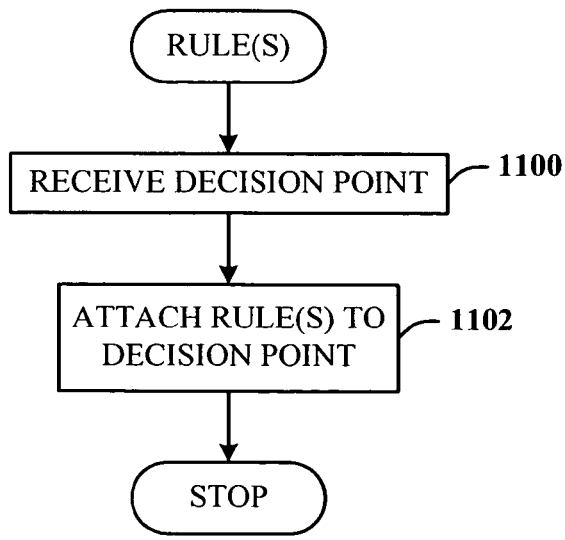
FIG. 11 illustrates another methodology of applying rules by attaching the rules to a decision point in accordance with the rules architecture of the present invention.

Referring now to FIG. 11, there is illustrated another methodology of applying a rule by attachment to a decision point in accordance with the rules architecture of the present invention. At 1100, a decision point is exposed. At 1102, the rule is attached to the decision point. The rule can be attached to the decision point that is used to supply items for evaluation by the rule.

Figure 12:
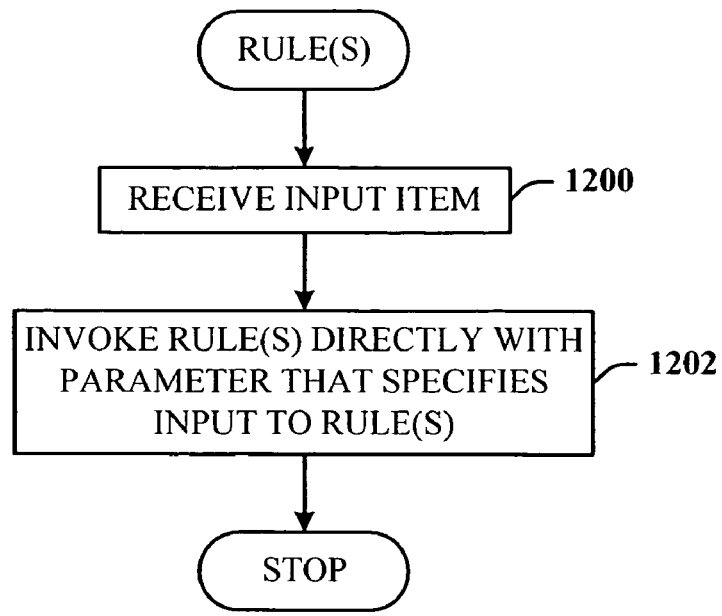
FIG. 12 illustrates another methodology of applying rules by invoking the rules directly in accordance with the rules architecture of the present invention.

Referring now to FIG. 12, there is illustrated another methodology of applying a rule by invoking the rule directly in accordance with the rules architecture of the present invention. At 1200, an input item is received for processing. At 1202, the rule is invoked directly with a parameter that specifies the input thereto.

Figure 13:
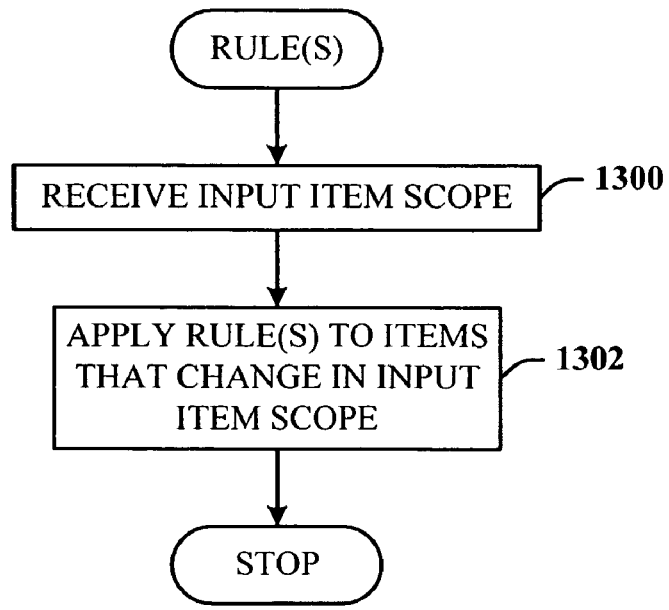
FIG. 13 illustrates another methodology of applying a rule in accordance with the rules architecture of the present invention.

Referring now to FIG. 13, there is illustrated another methodology of applying a rule in accordance with the rules architecture of the present invention. At 1300, an input item scope is received for processing. At 1302, the rule is applied to those items that change in the input item scope. This last case models a common use of rules to provide active behavior (sometimes called eventing capability). In this use of rules, the input items are "raised by events" and the results of rule evaluation may cause "actions" to be executed. The novel rules platform provides this active eventing capability as a layer on top of the rules system.

Figure 14:
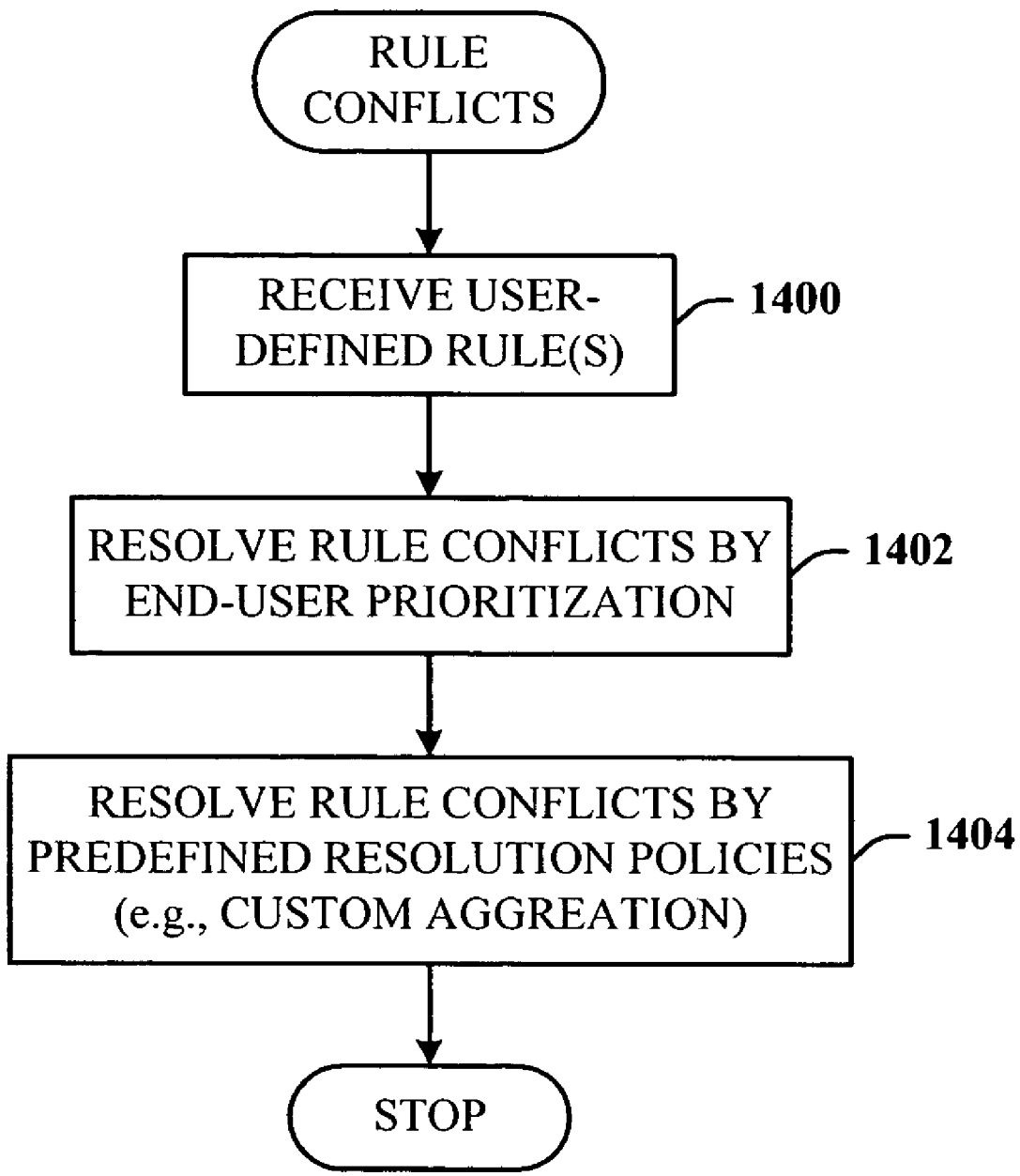
FIG. 14 illustrates one methodology for rules conflict resolution in accordance with the present invention.

Referring now to FIG. 14, there is illustrated one methodology for rules conflict resolution in accordance with the present invention. By default, the behavior of a end-user logic is the cumulative behavior of the individual rules. However, in many cases, rules can have "conflicting" interactions. At 1400, a user-defined logic that includes a plurality of rules is received for processing. A few different conflict resolution policies are supported. For example, at 1402, rule conflicts can be resolved by a resolution component that facilitates end-user rule prioritization of the rules. At 1404, an alternative method of the resolution component provides that rules conflicts can be resolved by developer-defined resolution policies (e.g., custom aggregation).

The rule creation framework consists of items and relationships used when creating rules and when building applications that use rules. These items and relationships are used by the rules engine of the rules platform to determine what the computer should do in response to specific events. To customize application behavior based on end-user rules, two things happen: the programmer "rule enables" functions of the software, and end users create rules for those functions. Rule-enabling means defining EUP components associated with application defined types or OOTB (out-of-the-box) types for the user to compose into rules. Enabling also means creating decision points against which rules can be attached. For example, rule-enabling operating system features are included so that users can define rules on changes to items such as a folder and documents.

The rules APIs are used to introduce rules inputs into the rules evaluation engine, maintain end-user rules, and register and reflect on various portions of the rules architecture, including conditions, actions, bindings, etc. The rules APIs are implemented as helper methods that complete the partial classes defined by the rules types, with three exceptions: rule input, rule input collection, and rule exception types. This means that the APIs for rules are APIs against the rules types. The rules APIs of the present invention provide the following.

Separated AppCustomization/Active Rules types from Query types. Separation allows different helper methods to be constructed on Query-related types and AppCustomization types. This is also a simplification from a developer perspective; developers interested only in utilizing the rules engine for application customization within their application need learn only those APIs.

Combined Rule, Rules concepts. Rules are made up of constraint information (input type and output type) and one or more LogicStatements. Each LogicStatement consists of a Condition tree and one or more results.

LogicResult type family (for future extension). LogicResult is a base type from which result types inherit. Supported are two result types, the existing "Action" which contains an encoded method call (FunctionInfo) as well as, a Boolean return type (mainly used in QueryFilters/AutoLists). In another implementation, this can be extended to cover scalar and XML (eXtensible Markup Language) results.

Value-based Connections Between EUP Items. This is an additional way of relating items rather than insisting on an explicit relationship/link between items. The rules API uses ItemIds for encoding rule attachment, etc. An Association concept, a kind of declared value-based relationship, is utilized with this mechanism.

The rules API (another way of referring to the EUP components) consists of types within the System.Storage.Rules namespace. It provides a means to introduce new events (RuleInput, RuleInputCollection). With few exceptions, these types are the EUP components and program enumerated earlier. These types are schematized types, which means they are instantiated, persisted, and discovered using standard store operation APIs. The types provide the means to create and maintain user rules (types deriving from RuleLogic). These rules can be active rules, rules for application customization, or structured query rules.

Figure 15:
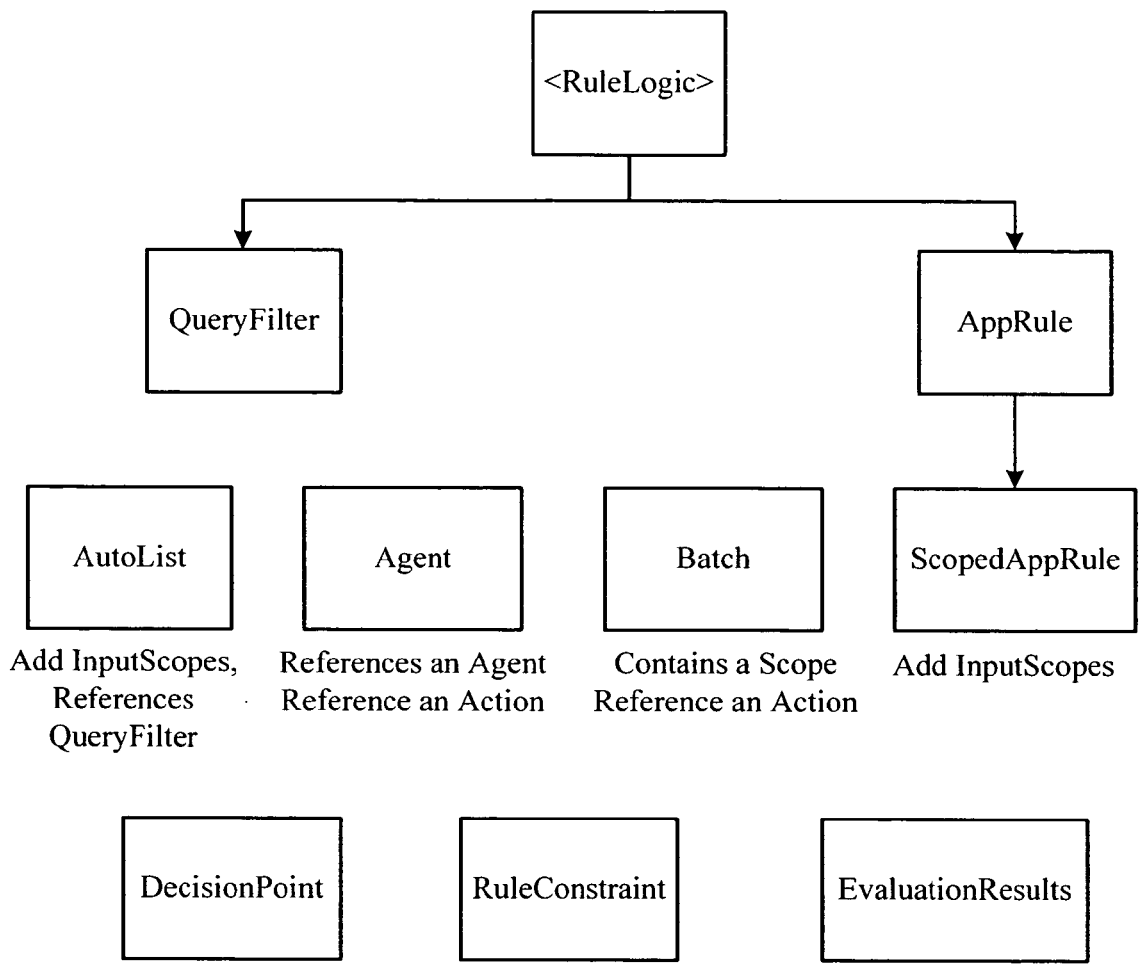
FIG. 15 illustrates items types and associated relationships in accordance with rules architecture of the present invention.

Referring now to FIG. 15, there are illustrated items types and associated relationships in accordance with rules architecture of the present invention. Most of the public API exposed by the rules platform consists of types declared in the System.Storage.Rules schema. The rules schema defines the EUP component item types. These are used to instantiate rule logic on a users' behalf, allow applications to declare decision points to which rule logic can be attached, and to hold and communicate the results of rule evaluation.

RuleLogic. The base type of all items holding user rule logic. This contains the basic "shape" common to all rules.
Derives from: (OS file system).item
Properties added in the type:
 Constraint: The LogicConstraint for this rule.
 Statements: a multiset of LogicStatement. Each rule contains one or more statements (condition/action pairs). The conditions are evaluated, and if true, the actions are returned as results. The ordering within the multiset implies a priority ordering among the statements; Statements[0] has the highest priority. Ordered multisets can also be implemented. RuleLogic items with no statements are considered illegal. In one implementation, when biz logic exists, runtime exceptions can be thrown.
 Enabled: Boolean marking that this piece of logic is enabled or disabled (default: true)
Methods added to the type: none.
QueryFilter. A QueryFilter represents filtering logic authored by a user. The statements in a QueryFilter have LogicConstraints specifying Boolean output types.
Derives from: RuleLogic
Properties added to the type: none.
Methods added to the type:
 QueryFilter(Type inputItemType): constructor allowing the input item type to be set. A result type of Boolean will be set in the LogicConstraint.
 QueryFilter(Type inputItemType, LogicStatment 1): constructor setting input item type (as above) as well as adding a single LogicStatement.
 Collection Evaluate(CollectionScope cv): evaluates the query filter given the input collection. Returns results as a collection of ItemIds.
 Collection Evaluate(AutoList a): evaluates the query filter given the AutoList as the input collection.
 Boolean Evaluate(Item i): evaluate a single item over the LogicStatements held within this QueryFilter; return the final result
AutoList. An AutoList represents the windows browsing metaphor concept of an AutoList. This refers QueryFilter+ InputScopes, and can be evaluated with results returned through an ItemSearcher.
Properties added to the type:
 InputScopes: multiset of InputScope. AutoLists have one or more
 input scopes over which their filters are applied when evaluated. AutoLists with 0 input scopes are illegal. Runtime exceptions can be thrown when biz logic exists.
 QueryFilters: multiset of ItemIds of QueryFilter items containing logic definitions to be used when evaluating this AutoList.
Methods added to the type:
 AutoList(Type inputItemType, InputScope inputScope): constructor allowing the input item type as well as an input scope to be set. A result type of Boolean will be set in the LogicConstraint.
 AutoList(Type inputItemType, InputScope inputScope, QueryFilter): constructor setting input item type, one input scope, as well as adding a reference to a single QueryFilter
 ItemSearcher GetItemSearcher( ): returns an ItemSearcher over the results of evaluating this AutoList.
 Internal string GetViewName( ): returns the name of the generated view backing this AutoList. Used for ItemSearcher integration.
AppRule. AppRules are used in application customization scenarios.
Derives From: RuleLogic
Properties added to the type:
 DecisionPoint: the ItemId of the decision point this AppRule is attached to.
Methods added to the type:
 AppRule(LogicConstraint 1c): Constructor allowing LogicConstraint to be set
 AppRule(LogicConstraint 1c, LogicStatement 1): Constructor allowing LogicConstraint to be set and a single LogicStatement to be added.
 EvaluationResults Evaluate(Item inputItem): Evaluates this AppRule for the given input item and returns the generated results.
 EvaluationResults Evaluate(CollectionValue c): Evaluates this AppRule for each of the items within the specified collection and returns the generated results.
ScopedAppRule. ScopedAppRule is mainly used in Active Rules scenarios to add input scopes over which the rule logic should be applied. It is possible that certain application customization scenarios will require the association of logic with locations in the file system. These scenarios can make use of these items with their own decision points.
Derives From: AppRule
Properties added to the type:
 InputScopes: multiset of InputScope (see below). ScopedAppRules have one or more input scopes over which their logic is applied. ScopedAppRules with 0 input scopes are illegal. Runtime exceptions can be thrown when biz logic exists.
Methods added to the type:
 ScopedAppRule(LogicConstraint 1c, InputScope inputScope): Constructor allowing the LogicConstraint and a single input scope to be set
 ScopedAppRule(LogicConstraint 1c, InputScope inputScope, LogicStatement 1): Constructor allowing the LogicConstraint and a single input scope to be set, as well as adding a single LogicStatement.
DecisionPoint. DecisionPoints are created by applications to describe when and where they will be submitting input into the rules engine and what kind of results they expect to receive. DecisionPoints are a mechanism through which applications can submit input to the rules engine for application customization scenarios.

Derives From: (OS file system).item

Properties of the type:

ApplicationName: the name of the application or schema that created the DecisionPoint. This can be used, for instance, by a UI (user interface) application to show all the DecisionPoints for a given application.

ScopeRequired: when true, any RuleLogic items attached here must have Input Scopes defined (ScopedAppRule).

Constraint: a LogicConstraint (see below) describing the constraints on rules created for this DecisionPoint. This constraint describes the kind of input (OS file system type id) which will be submitted by the application when it reaches this DecisionPoint, as well as the kind of output it will expect.

Methods added to the type:

DecisionPoint(string ApplicationName, LogicConstraint c, bool scopeRequired): constructor allowing all properties to be set.

EvaluationResults Submit(RuleInput r): Submits the given RuleInput and retrieves the EvaluationResults associated with its processing.

EvaluationResults Submit(RuleInputCollection r): Submits the given RuleInputCollection EvaluationResults. Each RuleInput submitted causes a single EvaluationResults item to be created. This item contains the results, if any, of rule evaluation based on the submitted data. The itemid of this newly created item is returned to the submitting application; it can then read the item data to determine which actions to take.

Derives From: (OS file system).item

Properties added to the type:

Results: a multiset of EvaluationResultElements, each of which contains a single rule result (action to be taken).

Methods added to the type: none.

FIG. 16A-H illustrate nested element types employed in accordance with the rules architecture of the present invention.

FIG. 16A shows the EvaluationResultElement nested type of the present invention. An EvaluationResultElement represents a single rule result (ActionResult to be taken or other kind of Result to be returned).

Derives From: (OS file system).NestedType

Properties added to the type:

Result: LogicResult specifying the returned result from the rule.

InputItemId: ItemId of the input item that caused this EvaluationResultElement to be generated.

RuleItemId: ItemId of the RuleLogic item that caused this EvaluationResultElement to be generated.

Statement: Integer specifying the Statement within the logic item that caused this EvaluationResultElement to be generated.

Methods added to the type:

void Execute(ItemContext ic): helper method. If the Result property contains an ActionResult, call the method specified within. This does not call ItemContext.Update( ); the caller does that. If the Result is not an ActionResult, this method should throw a RuleException.

Parameter Substitution: if the Result contains an ActionResult, the Arguments within that ActionResult will be ConstantValues representing the post-processed Arguments specified by the LogicStatement.

FIG. 16B shows an InputScope nested type of the present invention and its derivations. Represents an InputScope, either for an AutoList or for ScopedAppRule of FIG. 15.

Derives From: (OS file system).NestedType

Properties added to the type:

ItemId: The ItemId of the input scope

Methods added to the type:

InputScope(Guid inputScope)

CollectionScope is an InputScope that is a collection.

Derives From: InputScope

Properties added to the type:

RelationshipSchema: String schema name holding the relationship defining the collection RelationshipName: String name of the relationship type within the above schema defining the collection ShallowScope: Boolean: If True, the input scope should be limited to one level of relationship traversal. Defaults to False.

Methods added to the type:

CollectionScope(Guid inputScope, string relationshipSchema, string relationshipName)

AutoListScope is an InputScope that is an AutoList.

Derives From: InputScope

Properties added to the type: none.

Methods added to the type:

AutoListScope(Guid inputScope)

CSIDLScope is an InputScope that is a visual browsing metaphor CSIDL. CSIDL values provide a unique system-independent way to identify special folders used frequently by applications, but which may not have the same name or location on any given system.

Derives From: InputScope

Properties added to the type:

CSIDL: value of the CSIDL which is evaluated for the current user and used as input scope.

FIG. 16C shows the LogicConstraint nested type of the present invention. LogicConstraint is used both by RuleLogic (and children) and DecisionPoints. When used with a DecisionPoint, the LogicConstraint specifies the input item type to be submitted for evaluation as well as the output type expected by the declaring application. When used with RuleLogic, the constraint declares what input type the rule can be evaluated against, as well as what kind of output the rule generates.

Derives From: (OS file system).NestedType

Properties added to the type:

InputItemTypeId: OS file system TypeId specifying the input item type.

Output: A value from the OutputType enum (see below) specifying the output type

Methods added to the type:

LogicConstraint(Type inputItemType, OutputType ot): takes a typeOf(Item) and an OutputType (see below) and finds the appropriate OS file system TypeId to store in InputItemTypeId.

OutputType (enum), describes what type is output (or constraint on output type) for Logic/DecisionPoint. Used in LogicConstraint.

Values:

Boolean

FunctionInfo

FIG. 16D shows the LogicStatement nested type of the present invention. LogicStatements encode a condition tree and a set of results (actions or Boolean).

Derives From: (OS file system).NestedType
Properties added to the type:
   Condition: The condition tree of this logic statement.
   LogicResults: Multiset of LogicResult elements. Encodes the results if the condition evaluates to true.
Methods added to the type:
   LogicStatement(Condition c, LogicResult 1): Constructor setting the condition tree and a single result.

FIG. 16E shows the LogicResult nested type of the present invention and its derivations. LogicResult is the base class for all result types. It is never used on its own; rather its children are used to encode results from RuleLogic items.
Derives From: (OS file system).NestedType
Properties added to the type: none.
Methods added to the type: none.
   BooleanResult. Allows a piece of rule logic to return a Boolean value. Mainly used by QueryFilter/AutoList.
Derives From: LogicResult
Properties added to the type:
   Result: Boolean containing the result. Defaults to true.
Methods added to the type:
   BooleanResult(bool result)
   ActionResult. Actions are the results of active or application customization rules.
Derives From: LogicResult
Properties added to the type:
   FunctionInfo: a FunctionInfo encoding a method to call
   Arguments: Multiset containing ordered arguments for the FunctionInfo.
   Result: scalar result is a string, and an enum to describe the actual scalar value, e.g., int, date, string, etc.
Methods added to the type:
   Action(LogicResult 1r, params object[] arguments): Constructor setting the logic result and optionally any arguments necessary.
   ScalarResult(String result, enum ScalarType)
   ScalarResult.
Properties added to the type:
   Result: scalar result as a string, and an enum to describe the actual scalar value, e.g., int, date, string, etc.
Methods added to the type:
   ScalarResult(String result, enum ScalarType)

Figure 16F:
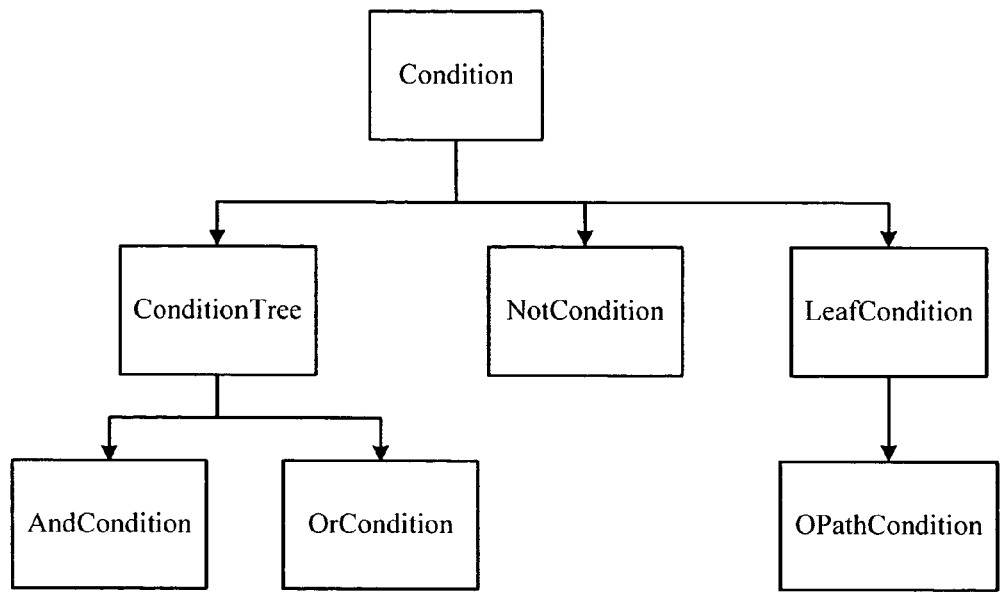
FIG. 16F shows the Condition nested type of the present invention and its derivations.

FIG. 16F shows the Condition nested type of the present invention and its derivations. Condition is a base type used to encode conditions of a rule. It is not instantiated directly; rather its child types are used as part of a given rule instance. Condition contains no properties of its own.
Derives From: (OS file system).NestedType
Properties added to the type: None.
Methods added to the type:
   public static Condition operator & (Condition left, Condition right): overload "&" to create a new AndCondition with the left and right params
   public static Condition operator |(Condition left, Condition right): overload "|" operator
   public static Condition operator !(Condition c): returns a NotCondition with Condition c ConditionTree derives from Condition and encodes a series of conditions. ConditionTree is never used directly; rather its children AndCondition and OrCondition are used.
Derives From: Condition
Properties added to the type:
   Children: a multiset of Conditions. These may be single conditions or other trees.
Methods added to the type:
   None.

AndCondition derives from ConditionTree. When an AndCondition tree is added to a rule, it signifies that the component conditions should be evaluated and the results logically ANDed together when determining the success of the rule evaluation.
Derives From: ConditionTree
Properties added to the type: None.
Methods added to the type:
   AndCondition(params Condition[] operands): a constructor allowing the component conditions to be specified at construction time.

OrCondition also derives from ConditionTree. When an OrCondition tree is added to a rule, it signifies that the component conditions should be evaluated and the results logically ORed together when determining the success of the rule evaluation.
Derives From: ConditionTree
Properties added to the type: None.
Methods added to the type:
   OrCondition(params Condition[] operands): a constructor allowing the component conditions to be specified at construction time.

NotCondition derives from Condition. When a NotCondition is added to a rule, the constituent condition is evaluated and the negation of the result is then used.
Derives From: Condition
Properties added to the type:
   Condition: a single Condition (or any derived type like ConditionTree)
Methods added to the type:
   NotCondition(Condition condition): a constructor allowing the condition to be specified at construction time.

LeafCondition is used to represent an actual condition. It describes the name of the condition function to use, as well as a multiset of arguments to use with the named condition function.
Derives From: Condition
Properties added to the type:
   Name: the name of the condition function to use during evaluation. Currently this can name any of the supported SQL comparators, either of the built in set-oriented conditions, or any method on the triggering item type.
   Supported SQL built-ins (and textual equivalents) are "=", "Equals", ">", "GreaterThan", "<", "LessThan", ">=", "GreaterThanEqualTo", "<=", "LessThanEqualTo", "<>", "NotEqual", "Like"
   Supported set-oriented conditions:
      ANY_IN: used with a RelationshipValue and a CollectionValue. Determines if any of the relationships defined in the named collection are of the type specified in the RelationshipValue.
      ALL_IN: used with a RelationshipValue and a CollectionValue. Determines if all of the relationships defined in the named collection are of the type specified in the RelationshipValue.
   Arguments: a multiset of arguments to the named condition function. Since, in one implementation, MultiSet is unordered, LeafCondition1 and LeafCondition2 properties are used.
Methods added to the type:
   LeafCondition(string name, params object[] arguments): a constructor allowing the condition function name and arguments to be set at construction time.

Figure 16G:
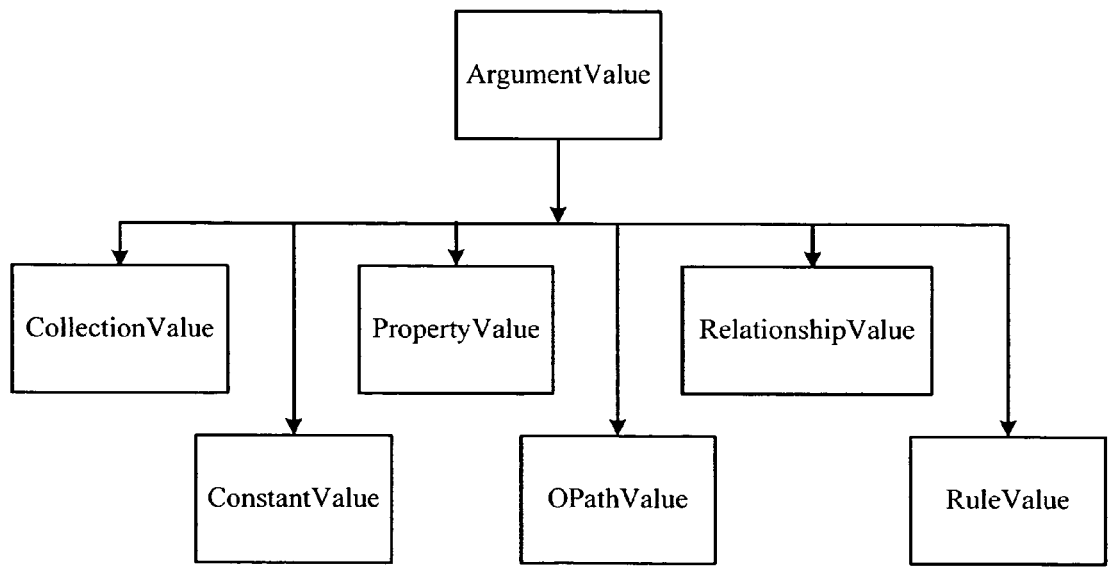
FIG. 16G shows the ArgumentValue nested type of the present invention and its derivations.

OPathCondition represents a complex, developer-defined blob of OPath. The OPath expression must evaluate to a Boolean return value in order to be used—for example: ("Count(OutDocumentAuthorRelationships)>1").
Derives From: LeafCondition
Properties added to the type:
  OPath: String containing the OPath expression
  DisplayName: String name for this blob of OPath that is displayed in a query builder or other UI.
  Methods added to the type:
  OPathCondition(string exp): Constructor setting the OPath expression FIG. 16G shows the ArgumentValue nested type of the present invention and its derivations. ArgumentValue is a base type used to encode arguments for both conditions and actions. It is not instantiated directly; rather its child types (ConstantValue, PropertyValue, RelationshipValue, CollectionValue, etc.) are used.
Derives From: OS file system.NestedType
Properties added to the type: None.

ConstantValue derives from ArgumentValue and is used to represent constant values in arguments for conditions and actions of a rule.
Derives From: ArgumentValue
Properties included in the type:
  Value: contains the single string value to be represented by this argument.
Methods added to the type:
  ConstantValue(string value): a constructor allowing the value to be set directly at construction time.

PropertyValue derives from ArgumentValue and is used to represent arguments to conditions and actions which are properties of OS file system types. Note that in another implementation, type GUIDs can be used rather than string schema and type names for consistency with triggering item type in the rules architecture.
Derives From: ArgumentValue
Properties included in the type:
  PropertyName: contains the name of the property on the inbound item to be used as the parameter.
Methods added to the type:
  PropertyValue(string propertyName): a constructor allowing the property name to be specified at construction time.

RelationshipValue derives from ArgumentValue and is used to represent the name of a relationship to be used as a parameter to any of the set-oriented conditions.
Derives From: ArgumentValue
Properties included in the type:
  RelationshipSchemaName: contains the name of the schema the Relationship type can be found in.
  RelationshipName: contains the name of the Relationship type.
Methods added to the type:
  RelationshipValue(string relationshipSchemaName, string relationshipName): a constructor allowing the schema name and type name to be specified at construction time.

CollectionValue derives from ArgumentValue and is used to represent the name of a collection to be used as a parameter to any of the set-oriented conditions.
Derives From: ArgumentValue
Properties included in the type:
  CollectionItemId: Guid item id of the collection item
  RelationshipSchemaName: the name of the schema the Relationship in this collection can be found in
  RelationshipName: the name of the Relationship type contained in this collection.
Methods added to the type:
  CollectionValue(Guid itemid, string relationshipSchemaName, string relationshipName): constructor allowing all property values to be set at construction time.

RuleValue derives from ArgumentValue and is used to represent some RuleLogic to be evaluated and used as a parameter in a LeafCondition. When a RuleValue is used as a parameter to any of the set-oriented conditions, it is expected to point at an AutoList (an exception should be generated otherwise). When a RuleValue is used as a parameter to any of the builtin scalar conditions ("=", "<", etc), it can point at any RuleLogic. RuleValue can also return a Boolean.
Derives From: ArgumentValue
Properties included in the type:
  RuleId: Guid item id of the rule item
Methods added to the type:
  RuleValue(Guid ruleItemId): constructor allowing all property values to be set at construction time.

Figure 16H:
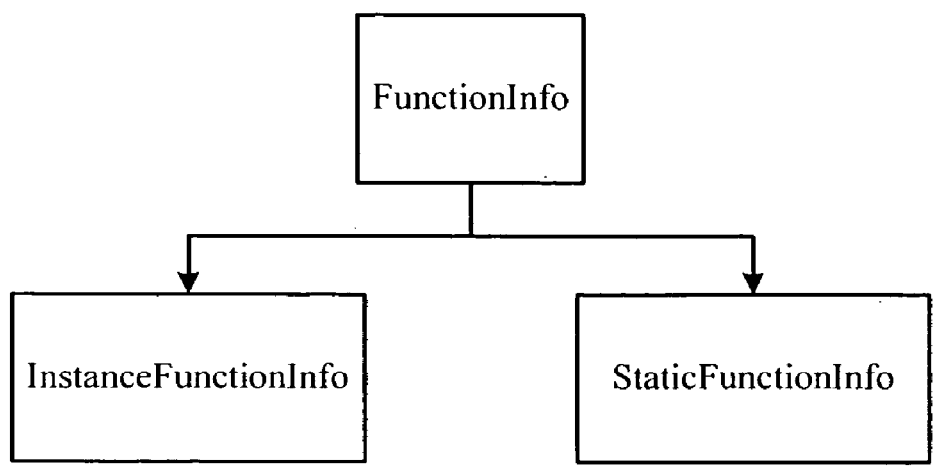
FIG. 16H illustrates a FunctionInfo nested type of the present invention and its derivations.

OPathValue allows the use of an OPath expression as the LHS or RHS of a LeafCondition.
Derives From: ArgumentValue
Properties added to the type:
  OPath: the OPath expression
  DisplayName: The name to display in a query builder or other UI
Methods added to the type:
  OPathValue(string exp, string displayName): Constructor allowing all property values to be set at construction time FIG. 16H illustrates a FunctionInfo nested type of the present invention and its derivations. FunctionInfo is a base type used to represent information on methods to be called as Actions. FunctionInfo is never used on its own; rather, its child types InstanceFunctionInfo and StaticFunctionInfo are used.
Derives From: (OS file system).NestedType
Properties added to the type:
  MemberName: the name of the method to be called or the name of a property whose "set_" method should be called.
Methods added to the type:
  FunctionInfo(string memberName): constructor allowing the name of the member to be set at construction time.
  internal virtual void Execute(ItemContext context, List<ArgumentValue> arguments): this method is overridden in child classes to perform the named method call.

InstanceFunctionInfo derives from FunctionInfo and is used to represent method calls on particular item instances.
Derives From: FunctionInfo
Properties added to the type:
  TargetItemId: the item id of the item on which the method should be called. Note that when encoding a method call into an ActionResult element as part of rules creation, you will leave TargetItemId empty if the method call should be made on the input item. If the call should be made on a particular item, that items' ID should be set here.
Methods added to the type:
  InstanceFunctionInfo(string memberName): constructor allowing the name of the member to be set at construction time.
  InstanceFunctionInfo(string memberName, Guid TargetItemId): constructor allowing the name of the member and the targeted item id to be set at construction time.
  internal void Execute(ItemContext context, List<ArgumentValue>arguments): executes the method specified by the InstanceFunctionInfo data. Note that context.Update( ) is not called at the end; the caller takes care of that—which is important if the method call had side effects on any OS file system data in memory.

StaticFunctionInfo derives from FunctionInfo and is used to represent a static method call.

Derives From: FunctionInfo

Properties added to the type:
- AssemblyName: the name of the aseembly in which the method can be found.
- TypeName: the name of the type within the assembly on which the method is defined.

Methods added to the type:
- StaticFunctionInfo(string assemblyName, string typeName, string memberName): constructor allowing the AssemblyName, TypeName, and MemberName to be set at construction time.
- Internal void Execute(ItemContext context, List<ArgumentValue>arguments): executes the method specified by this StaticFunctionInfo. Note that context.Update ( ) is not called at the end; the caller must take care of that—which is important if the method call had side effects on any OS file system data in memory.

Several non-File System types are part of the OS file system rules API.

RuleInput is used to define and submit input to the platform. Inputs submitted will trigger evaluation of Rules attached to the scopes in which the events occurred. To submit the inputs, use the submission methods found on the DecisionPoint type.

Properties of the type:
- Int64 Id: the id of this RuleInput. After an RuleInput is successfully submitted, it will be assigned an Id by the platform.
- Guid EventDataItemId: the itemid of the WinFS item on which the event occurred.

Methods of the type: none.

RuleInputCollection derives from System.Collections.CollectionBase. Its allows submission of multiple RuleInputs simultaneously. The generated RuleSetEvaluation item contains the combined results from all the submitted events in the batch. Submission of an empty RuleInputCollection is valid. The returned Guid will be set to Guid.Empty.

Properties of the type: None.

Methods of the type:
- RuleInput this[int index]: indexer allowing access to the contained RuleInputs using array index accessor.
- int Add(RuleInput value): adds the specified RuleInput to the collection. Throws InvalidOperationException if the RuleInput is already in the collection.
- bool Contains(RuleInput value): returns true if the collection includes the given RuleInput, false otherwise.
- int IndexOf(RuleInput value): returns the index of the given RuleInput in the collection.
- void Insert(int index, RuleInput value): inserts the value into the collection at the specified index.
- void Remove(RuleInput value): removes the given file system rules event from the collection.

RuleException. When one of these APIs fails an exception is thrown. When a "normal" exception described for a standard situation applies, or a system exception is exactly what is desired to be thrown, the standard exception is used, e.g.,
- ArgumentNullException
- ArgumentOutOfRangeException
- InvalidOperationException The OS file system rules API indexers (C# "this" property) throw an ArgumentOutOfRangeException if the key does not match an entry in the collection. Indexers return a valid object or throw an exception, and will not return with a null value as System.Collections.Hashtable does. Other errors detected by the OS file system rules or SQL Client are thrown as an RuleException.

Sample Code

```
1   using(ItemContext ic) {
2       Folder myFolder = ... ;
3
4       // create a simple QueryFilter for Documents starting with F
5       QueryFilter qf = new QueryFilter(typeof(Document), new LogicStatement(
6           new LeafCondition("like", "Title", "F%"),
7           new BooleanResult(true)));
8       myFolder.OutFolderMemberRelationships.Add(new FolderMember(qf));
9
10      Folder myDocumentsFolder = ... ;
11      // create an AutoList of Documents bigger than 512k in the above folder
12      AutoList al = new AutoList(typeof(Document), myDocumentsFolder, new LogicStatement(
13          new LeafCondition(">", "Size", "524288"), new BooleanResult(true)));
14      myFolder.OutFolderMemberRelationships.Add(new FolderMember(al));
15
16      // now, modify our AutoList to use the QueryFilter as well
17      al.Statements.Add(new LogicStatement(new RuleValue(qf), new BooleanResult(true)));
18      ic.Update( );
19
20      ItemSearcher i = al.GetItemSearcher( );
21
22
23      // Declare a Decision Point
24      DecisionPoint dp = new DecisionPoint("My Application",
25          new LogicConstraint(typeof(Document), OutputType.FunctionInfo),false);
26      myFolder.OutFolderMemberRelationships.Add(new FolderMember(dp));
27
28      // Create an AppRule "attached" to this DP
29      AppRule ar = new AppRule(dp.Constraint, new LogicStatement(
30          new LeafCondition("like", "DisplayName", "WinFS Rules%"),
31          new ActionResult(new StaticFunctionInfo("System.Xml", "System.Xml.XmlConvert",
32          "EncodeName"))));
33      ar.DecisionPoint = dp.ItemId;
34
35      // add additional LogicStatments
36      ar.Statements.Add(new LogicStatement(new LeafCondition("<", "Size", "128"),
37          new ActionResult(new InstanceFunctionInfo("set_Comment"), "Small Document")));
38
39      myFolder.OutFolderMemberRelationships.Add(new FolderMember(ar));
40
41      RuleInput r;
42      EvaluationResults er = dp.Submit(r);
43      foreach(EvaluationResultElement ere in er.Results) {
44          ... ;
45      }
46  }
```

Operator Discovery in LeafConditions. One way in which a developer can discover which operators are supported is to have an enum of all the valid operators. The benefit is that the developer can quickly discover all the valid operators. Issues of misspelled operators can also then be avoided. Another way is to define a unique class for each operator, for example, BetweenOperator(value1, value2, value3), GreaterThanOperator(value1, value2), etc.

In another optimization, QueryFilters and AutoLists can only have Boolean results in their logic statements. The API can ensure that people only have Boolean results in QueryFilters and AutoLists by creating a special BooleanStatement type, separate from the statements used for AppRules.

Following is a description of end-user queries and filters, and API mechanisms to execute them. The objects QueryFilter and AutoList are built when constructing queries on behalf of the end-user, or when constructing queries that the end-user will subsequently see, use and reason about.

A query is defined by a scope of items and a QueryFilter applied to those items. The result of a query is a set of items, and for all practical purposes, the end-user sees little difference between a query and a physical List. Hence, the user's concept of a "query" refers to the process of ad-hoc dynamic filtering of data, which when persisted becomes an AutoList, which is a List whose content is computed on demand. The terms List and AutoList are used interchangeably.

The end-user constructs queries using two visual mechanisms. Firstly, a navigational UI via which the end-user can run queries by performing any of the following navigational tasks of opening a page to display the content of a List or an Auto-List, stacking or sorting the items in a list (or auto-list) by a particular property or properties, and "drilling into" a particular stack. Secondly, a rich query UI provided to the end-user can facilitate composing a richer query filter by using a query builder UI integrated into the list viewer page.

Query construction is not a one-time process, rather it is an incremental and compositional process. For example, compositional stacking allows the user to stack documents by title, and then drill into one title. The remaining Documents are then stacked by date and he or she drills into one year.

Composition of filters. The user defines a filter such as "ModifiedLastMonth" as documents with a modifiedDate between ([Today]—30 days) and ([Today]—60 days). This can be created run and possibly saved within the query builder UI.

Composition of AutoLists. The user defines "MyImportantDocuments" as all documents in the 'all items' scope with the keyword "Important" and saves this as an autolist. The user starts with "MyImportantDocuments" as the input scope for a new autolist by navigating to MyImportantDocuments by opening the view. The user uses the "ModifiedLastMonth" query filter on "MyImportantDocuments" using the Query Build UI and then saves the resulting autolist as "ImportantDocumentsUpdatedLastMonth"

Multi-statement filters. The user uses the query build UI to create a filter such as 'music type IS jazz'. The user adds the additional filter "OR" 'music artist IS Joni Mitchell'. The user adds the additional filter "AND" 'music album title does NOT CONTAIN "Original Soundtrack"'

Over time, a query can be saved as an AutoList, retrieved, and edited further. The filters used in a query may also be used for other aspects of end-user programming—to define rich actions and rich events. Finally, AutoLists and filters themselves can be queried (e.g., find me the AutoLists that utilize the MyDocuments list, because I'm going to delete that list).

Query results are viewed by the user. The presentation information falls into two categories.

Query meta-data. Specific end-user properties of the selected items are presented. The end-user can add or remove specific properties to the list of columns shown to the user as part of the query results. These presentation details are collectively called the View Definition. The same query or AutoList may conceptually have different View Definitions, per application and/or per user.

Application meta-data. Applications may also associate application-specific data with a ViewDefinition to capture contextual meta-data used in the application (e.g., background color when viewing an AutoList).

In order to present an AutoList in a rich navigational UI, a flexible and powerful cursoring model is necessary. The presentation elements of a query or AutoList have no impact on the query definition (which is a logical and declarative definition of the content of the query).

Following are end-user scenarios. In a first scenario, save and reuse functionality of provided when the user filters down to items they cares about, saves as an AutoList and then goes back to that set. Local view persistence allows the user to go back to the saved AutoList where the same view is provided when the AutoList was saved. A common platform for query persistence across applications is provided whereby a second user who chooses to look at a "People I'm meeting with" AutoList defined from within an application is able to browse to this query and see the people who will be at the meeting. In general, the user can see and browse to AutoLists created by many different applications.

In a second scenario, query composition is provided so that the second user can see all the reports for client's that will be at the meeting. The second user creates a query to find all documents authored by people in the "People I'm Meeting" AutoList. To distribute AutoLists, the second user creates an Autolist for finding important client reports (based on the item data on his machine) and wants his team to use it. The second user distributes this to his team for everyone to save as an AutoList and run on their own machine against the data on their individual machines. To distribute view definitions, when a third user opens the saved Autolist from the second user she gets the same columns with filter icons, sort order and grouping that the second user created.

In a third scenario, a local query can be shared. The third user has a set of items she wants the second user to see. She shares access to the saved Autolist (on her own machine) for this set of items. Both the second and thirds users see the same set of items when they open this AutoList (except for security limitations). A graceful failure can be provided where the third user gets an Autolist from the second user that points to an application. The third user does not have the application. Thus, the Autolist opens in All Items instead.

It is possible to compose multiple QueryFilters and AutoLists to construct new QueryFilters and AutoLists. It is also possible to use an AutoList as the scope of a query.

Figure 17:
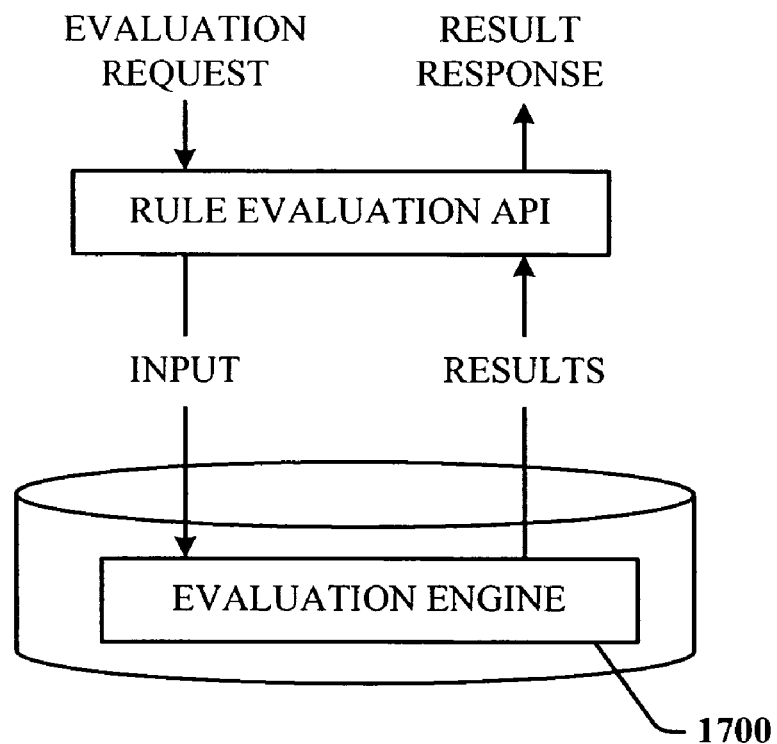
FIG. 17 illustrates a rules engine in accordance with the present invention.

Referring now to FIG. 17, there is illustrated a rules engine 1700 in accordance with the present invention. The disclosed rules platform consists of the rules engine 1700 that receives input and evaluates the appropriate rules. To invoke the rules engine 1700, applications submit data through decision point objects using a rules API (also called the rule evaluation API). The API submits the data to the rules evaluation engine and returns results via the API. The execution model is synchronous and the returned results are simply structured data. The rules engine 1700 evaluates rules using a query processor, and determines which rules to run, evaluates the rules against the input, and then returns results. In addition to being a storage platform for developers, the EUP model and abstractions for the file system are a significant part of the overall platform.

Figure 18:
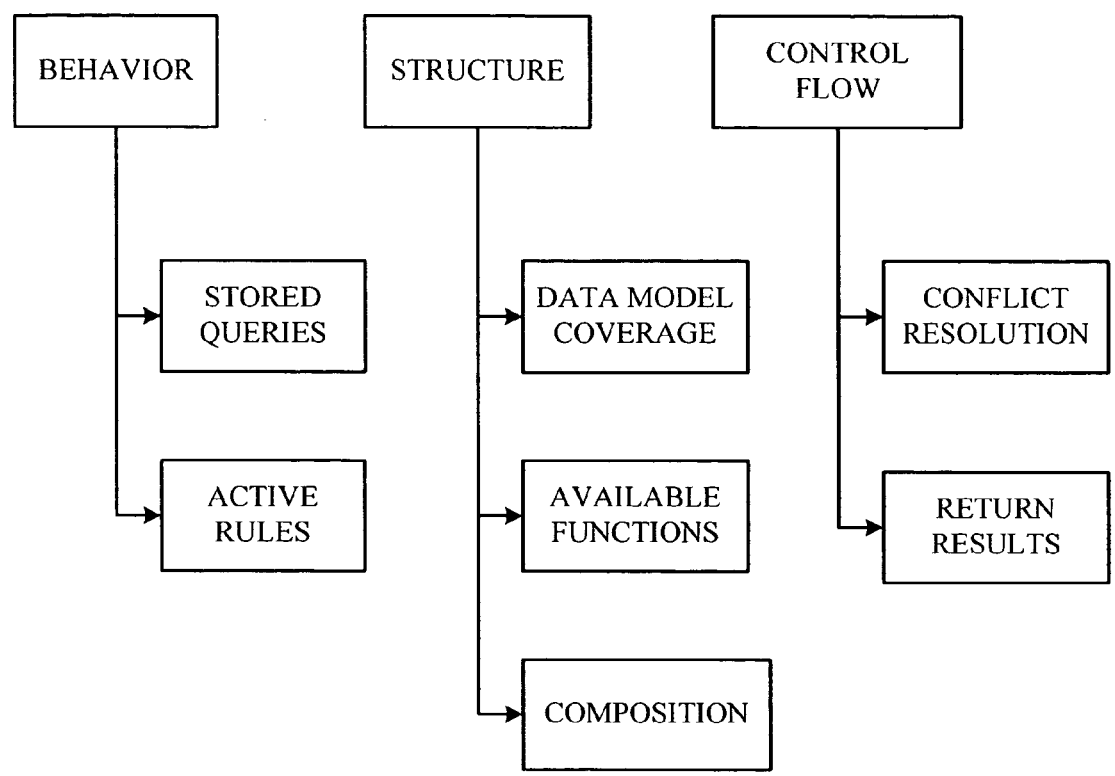
FIG. 18 illustrates a block diagram representative of the dimensions of richness in the rules architecture of the present invention.

Referring now to FIG. 18, there is illustrated a block diagram 1800 representative of the dimensions of richness in the rule architecture of the present invention. Provided capabilities fall into threes general categories: Behavior, Structure and Control Flow. With respect to Behavior, end-user rules are used for two basic kinds of customization: derivation rules that define data (stored queries), and active rules that define behavior. Derivation rules define rich queries over data, and define virtual data collections ("derived item sets") that behave like physical file system collections for the purposes of querying and rules. For example, the end-user might define a group of Contacts called PeopleWhoLiveInBellevue as a derived item set. Later, the user can query e-mail to find all mail sent by PeopleWhoLiveInBellevue.

Active rules are used by the end-user to define the behavior of an application at well-defined decision points where the application allows the end-user to augment application flow with logic. There are two kinds of decision points. Synchronous decision points are where the application reaches the decision point and raises a synchronous event that invokes the end-user rules. The rule evaluation API determines a set of results. The application then acts upon the results, possibly changing its behavior. Asynchronous decision points are where the application reaches the decision point, raises an asynchronous event and continues with its processing, in a "fire-and-forget" manner. The rules platform evaluates any appropriate rules, and then causes any related results to be acted upon.

With respect to the Structure block of FIG. 18, rules can be written over all aspects of the file system data model, to include item types, and the following aspects of item types: properties that are simple nested elements, properties that are multisets of nested elements, endpoints of relationships from the items, and extensions on the item. Rules can also be written for relationship types, and the following aspects thereof: properties that are simple nested elements, and properties that are multisets of nested elements. With respect to extensions, these behave essentially like item types.

With respect to the Available Functions block, the conditions and actions in a rule are similar to function calls. The most common functions are the built-in operators such as "=" etc. Any T-SQL (Transact-Structured Query Language) callable function is supported in conditions, and any client callable function is supported in actions. The functions supported are SQL operators on primitive data types, built-in SQL functions, set operators for quantification ANY_IN and ALL_IN, CLR methods defined in the store-side assembly for conditions (if registered as an UDF), and CLR methods defined in the client assembly for actions.

With respect to the Composition block, besides the "elements" defined in the file system schema, the file system rules algebra supports composition. A RuleSetAttachment is a first class object in that it can be used in a condition, or as the scope of another attachment.

A further form of composition involves the use of a strongly-typed Derived Rules as a function. Consider, for instance, defining one or more called "IsInteresting", which works on Document items. A rule can then be created which used "IsInteresting" as a condition function.

With respect to the Control Flow block, control flow is provided to the end-user using conflict resolution policies. Since these are complex pieces of code, the application developer constructs them. The end-user only chooses from the available policies.

Additional control flow can be achieved procedurally outside of the rules platform. Since the file system rules architecture can be used with the rules API, developers can use standard C# control flow constructs.

Rules Richness

Figure 19:
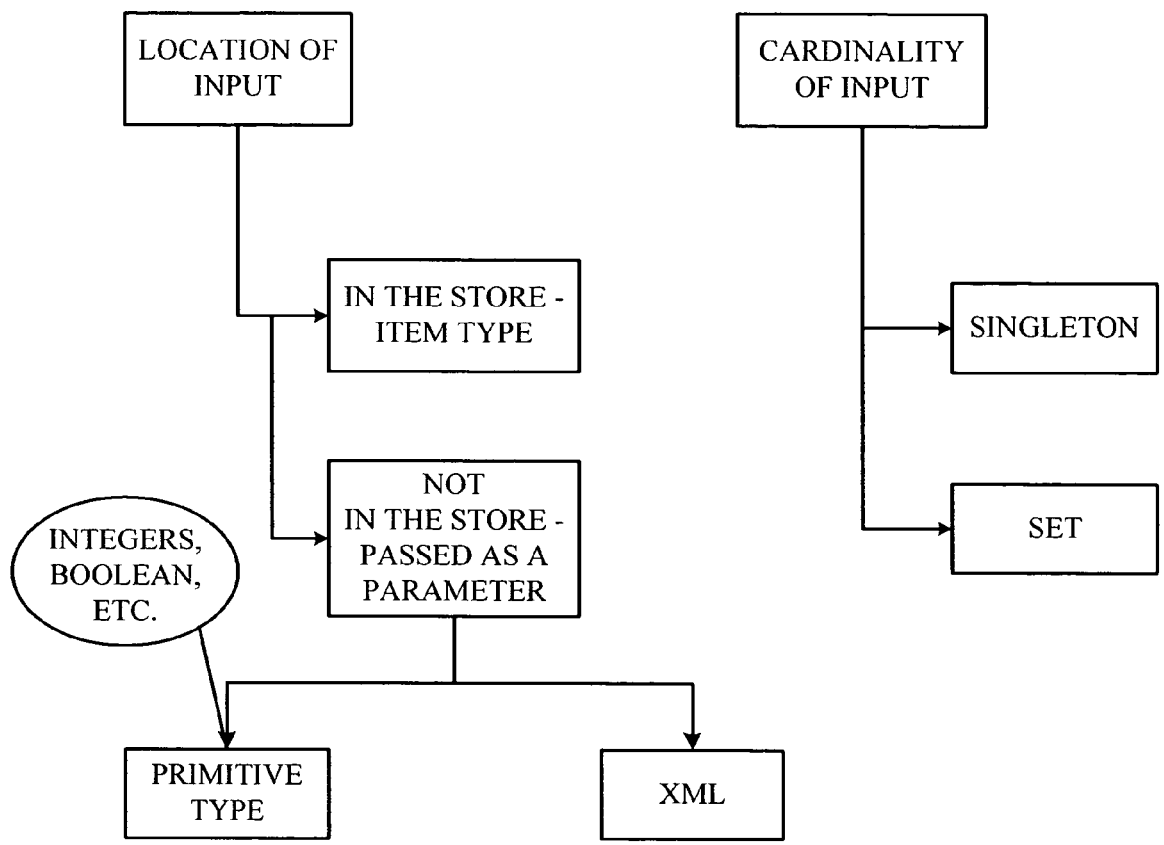
FIG. 19 illustrates a diagram that represents inputs of the rules architecture of the present invention.

Referring now to FIG. 19, there is illustrated a diagram 1900 that represents inputs of the rules architecture of the present invention. Reference is to the data that the conditions and actions act upon as input. The richness of the inputs falls along two dimensions: location of the input (e.g., in the store or not in the store), and cardinality of the input (e.g., singleton or set of inputs). The standard scenarios use the following combinations, as indicated in the following table.

| Scenario | Location of input | Cardinality of input |
| --- | --- | --- |
| Active rules | In store (Item types) | Set |
| Application customization | In store/Not in store (Item, primitive, XML) | Singleton/set |
| Apply now | In store (Item) | Singleton/set |
| Derived item set | In store (Item) | Set |
| Parameterized item sets | Not in store (primitive) | Singleton |

In the example, the input is a Message item in the store. In addition to file system Items, support is provided for both the submission of Relationships, as well as XML documents as Input to the rules engine. The rule itself can be parameterized by scalar values, requiring that arguments be provided prior to rule evaluation. These are called rule parameters.

Each of the conditions and actions has operands. Refer to the following example.

```
scalar_value = scalar_value        // Two scalars
scalar_value = COUNT(set_value     // An aggregate function transforms
a set into a scalar
scalar_value IN set_value          // Scalar and set
set_value ALL_IN set_value         // Two sets
```

Depending on the condition function, each of the operands is either a scalar expression, or a set.

A scalar expression is an expression whose value is a scalar type. The following scalar expressions are supported: a constant, (e.g., 1, "Hello"); a property of the input, including properties of item types or relationship types that are not multisets (e.g., [Document].Title, and if the property has nested properties, these are supported as well; and an aggregate function over a set. Rule parameters (described above) can also be used.

Set-based aggregate functions are associated with itemsets, relationships, and multisets of nested elements (e.g., Count, MIN, MAX, SUM, and AVG). Count is an aggregate function providing a count of the number of members in its argument set.

Example

Count(<ItemSet>) counts the number of items in the ItemSet.

Count(Message.Recipients) is an aggregate function providing a count of the number of Recipient relationships whose source is this Message.

Count(Message.OriginalDeliveryAccount.EAddresses) is an aggregate function providing a count of the number of addresses in the EAddresses nested element set.

The same set of aggregate functions as OPath are supported, which the same level of expressibility across the entire file system platform.

Developer-defined aggregate functions are supported in the model. Extensibility can also be implemented.

Some operators like ANY_IN have sets as operands. Sets can be constructed as a standard collection or a derived item set. A standard file system collection includes a relationship and a source item for that relationship (e.g., GroupMembership and MyFriends). As an important special case, the input item is the relationship source (e.g., Message.Recipient) or the relationship target (e.g., Message.AttachmentOf). As a multiset of nested elements in the input item, and as the set of extensions on the input item.

A derived itemset is defined by associating a derivation rule or rules with an input item scope. This association is captured by a RuleSetAttachment. For example, a derivation rule FriendlyPerson is attached to MyContacts as its input item scope to define the derived item set MyFriends. A derived itemset can be fully bound to an input scope or only partially bound. The contents of a fully bound derived itemset can be enumerated. A partially bound derived itemset requires that some or all inputs be provided in order for it to be evaluated. Every derivation Rule is also directly a partially-bound derived itemset. It needs an input item scope in order to be evaluated. For example, FriendlyPerson is a partially-bound itemset. This derivation can be referred to within conditions as a filtering function to be run over the input item. A RuleSetAttachment that only partially defines the inputs of the rules also defines a partially-bound itemset. For example, a People_By_Location requires both a Contact input item and a location as input. If it is attached to MyFriends as its input scope it becomes the partially bound derived itemset Friends_In (binding is represented by a RuleSetAttachment between the MyFriends input scope and the People_By_Location derived itemset). In order to evaluate the now partially bound derived itemset Friends_In, the location is provided.

The richness of the condition is defined by the inputs to the condition, and the functions that can be used in the condition. Inputs to the conditions have been defined previously. The functions allowed in a condition are the following: standard comparison conditions with scalar expression arguments, which comparison conditions include comparison operators—=, <>, >, <, <=, >=, BETWEEN and IN, and strings that support LIKE and CONTAINS; store side member-functions associated with the input type, if they return SqlBoolean; store side static functions which take the input item as a parameter, if they return SqlBoolean; and set-based conditions.

The following set-based conditions are supported for a flexible definition of ItemSets as described earlier. An important category of relevant itemsets are those that are defined by relationships sourced by or targeted at the input item. Partially-bound derived itemsets are considered separately.

---

IN <TargetItemSet>. E.g. <input_item> IN MyDocuments
<ItemSet> ANY_IN <TargetItemSet>. This returns true if any item in
   ItemSet is also in TargetItemSet. E.g.   Recipient ANY_IN MyFriends
      If the IN optional clause is not present, this returns true if there is
         at least one item in ItemSet. This condition is represented in short-
         form as EXISTS(<ItemSet>).
<ItemSet> ALL_IN <TargetItemSet>. This returns true if every item
   in ItemSet is also in TargetItemSet. For example Recipient ALL_IN
   MyFriends.

---

The three set-based conditions are also supported in two other flavors. A partially-bound target item set (the TargetItemSet is not fully bound; it is the use of the itemset in this condition that provides the complete input binding). This class of conditions can be used to express rich conditions against the properties of items in an itemset related to the input. For example, ISANY Recipient A FriendlyPerson. This class of conditions can also be used to express rich "join" conditions against other itemsets in the file system. For example, ISANYRecipient IN Friends_In('Bellevue') and EXISTS (Email_By_Subject(Message.Subject)).

With respect to a second flavor, a virtual target relationship set, when the input is a relationship (not an item), the set-based conditions can still be used with target sets defined by rules that work against relationships. Assume a CompanyAccount that takes a Message.Recipient relationship as an input and determines if the e-mail address is from the Company domain, e.g., ISANY RecipientRel A CompanyAccount The list of allowed results is known from the RuleConstraint. Each of these has a name and a well-known typed argument list. The end-user picks a set of results for each rule. Each result is specified by a name and argument bindings. The arguments can be bound to any scalar expression. Additionally, the end-user can define a data-driven set of results as follows:

FOREACH<ItemSet>[IN <TargetItemSet>] <Result . . . >
   e.g. FOREACH Recipient IN MyFriends SendMail( . . . )
   e.g. FOREACH Msg IN InBoxMessages_By_Subject
      ("rules") Msg.SetPriority(1)

The Result inside the FOREACH construct is any of the allowed kinds of results for this rule. The scalar arguments provided to these results can include properties of the item specified by the FOREACH clause, and properties of the rule inputs.

The rules collectively define the logical function desired by the user. Following is a description of how rules are evaluated, and how conflict resolution gives the end user an alternative to control flow constructs.

Rule execution uses the following logical semantics for a particular input item: evaluate the conditions of all rules, and for those rules whose conditions are true, resolve conflicts across the results. If there is a set of inputs, the result of the evaluation is simply the union of the results of rules evaluation against each individual item/relationship in that input scope. There are no special semantics when multiple items are submitted against a rule. Logically, each item is evaluated independently. Results arising from different inputs are never in conflict with one another.

The conflict resolution policy provides richness in the expressive power of the rules. Different conflict policies are supported. An end-user defined policy facilitates end-user priority assignment to rules, with a stop-processing option. The end-user assigns a unique priority to every rule. If the stop-processing flag is also set, this indicates that if this rule's conditions evaluate to true, then all rules with lower priorities should be ignored. A developer-defined policy includes the capability of inter-result priority assignment, where the developer can specify a unique priority for every result type. Among the potential results, only the highest priority results are retained. Additionally, the developer-define d policy facilitates intra-result aggregation-based conflict resolution, where the developer can specify aggregate functions that work on a set of results of the same result type, and aggregate them.

Using conflict resolution, the following rule behaviors are supported: rules statements can behave like a nested IF-THEN ELSE (IF THEN ELSE ( . . . )) expression by assigning unique end-user priorities to each rule, along with the stop-processing option; rules statements can behave like a C++ switch statement with fall-through across case statements, by using rule priorities without the stop-processing option; rules statementscan provide duplicate-free union and intersection semantics by using appropriate intra-result conflict resolution policies; rules statements can provide a voting-based semantics (at least three rules agree on the result) by the right intra-result conflict resolution policies; and rules statements can provide rich cross-result semantics by inter-result priority assignment.

Constraints can be added on the values supplied in conditions and actions via the file system business logic.

Conditions can be represented using the LeafCondition nested element type. Functions can be represented using StaticFunctionInfo and InstanceFunctionInfo. Arguments can be one of ConstantValue, PropertyValue, CollectionValue, RuleSetAttachmentValue.

Results can be represented using the Action nested element type. The function and arguments within the Action element are identical to those described for conditions above. In one implementation, multisets are supported in the store. In another implementation LeafCondition and Action support a maximum of five arguments.

Figure 20:
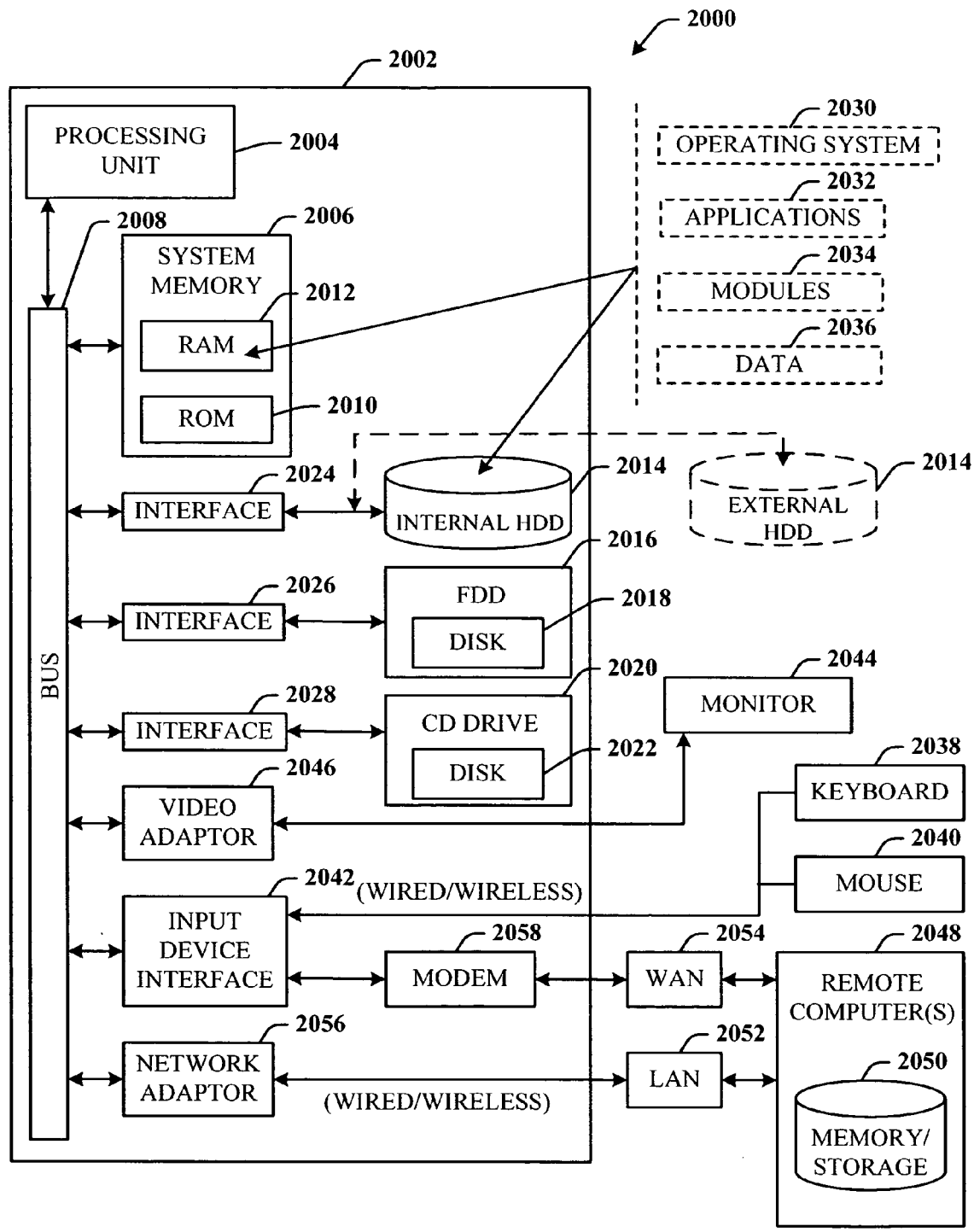
FIG. 20 illustrates a block diagram of a computer operable to execute the disclosed architecture.

Referring now to FIG. 20, there is illustrated a block diagram of a computer operable to execute the disclosed architecture. In order to provide additional context for various aspects of the present invention, FIG. 20 and the following discussion are intended to provide a brief, general description of a suitable computing environment 2000 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 20, there is illustrated an exemplary environment 2000 for implementing various aspects of the invention that includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures may also be employed as the processing unit 2004.

The system bus 2008 can be any of several types of bus structure that may further interconnect to a memory bus (with or without a memory controller), a peripheral bus, and a local bus using any of a variety of commercially available bus architectures. The system memory 2006 includes read only memory (ROM) 2010 and random access memory (RAM) 2012. A basic input/output system (BIOS) is stored in a non-volatile memory 2010 such as ROM, EPROM, EEPROM, which BIOS contains the basic routines that help to transfer information between elements within the computer 2002, such as during start-up. The RAM 2012 can also include a high-speed RAM such as static RAM for caching data.

The computer 2002 further includes an internal hard disk drive (HDD) 2014 (e.g., EIDE, SATA), which internal hard disk drive 2014 may also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012.

It is appreciated that the present invention can be implemented with various commercially available operating systems or combinations of operating systems.

A user can enter commands and information into the computer 2002 through one or more wired/wireless input devices, e.g., a keyboard 2038 and a pointing device, such as a mouse 2040. Other input devices (not shown) may include a microphone, an IR remote control, a joystick, a game pad, a stylus pen, touch screen, or the like. These and other input devices are often connected to the processing unit 2004 through an input device interface 2042 that is coupled to the system bus 2008, but can be connected by other interfaces, such as a parallel port, an IEEE 1394 serial port, a game port, a USB port, an IR interface, etc.

A monitor 2044 or other type of display device is also connected to the system bus 2008 via an interface, such as a video adapter 2046. In addition to the monitor 2044, a computer typically includes other peripheral output devices (not shown), such as speakers, printers etc.

The computer 2002 may operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices, and companies, and facilitate enterprise-wide computer networks, such as intranets, all of which may connect to a global communication network, e.g., the Internet.

When used in a LAN networking environment, the computer 2002 is connected to the local network 2052 through a wired and/or wireless communication network interface or adapter 2056. The adaptor 2056 may facilitate wired or wireless communication to the LAN 2052, which may also include a wireless access point disposed thereon for communicating with the wireless adaptor 2056. When used in a WAN networking environment, the computer 2002 can include a modem 2058, or is connected to a communications server on the LAN, or has other means for establishing communications over the WAN 2054, such as by way of the Internet. The modem 2058, which can be internal or external and a wired or wireless device, is connected to the system bus 2008 via the serial port interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

The computer 2002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11 a) or 54 Mbps (802.11b) data rate or with products that contain both bands (dual band), so the networks can provide real-world performance similar to the basic 10BaseT wired Ethernet networks used in many offices.

Figure 21:
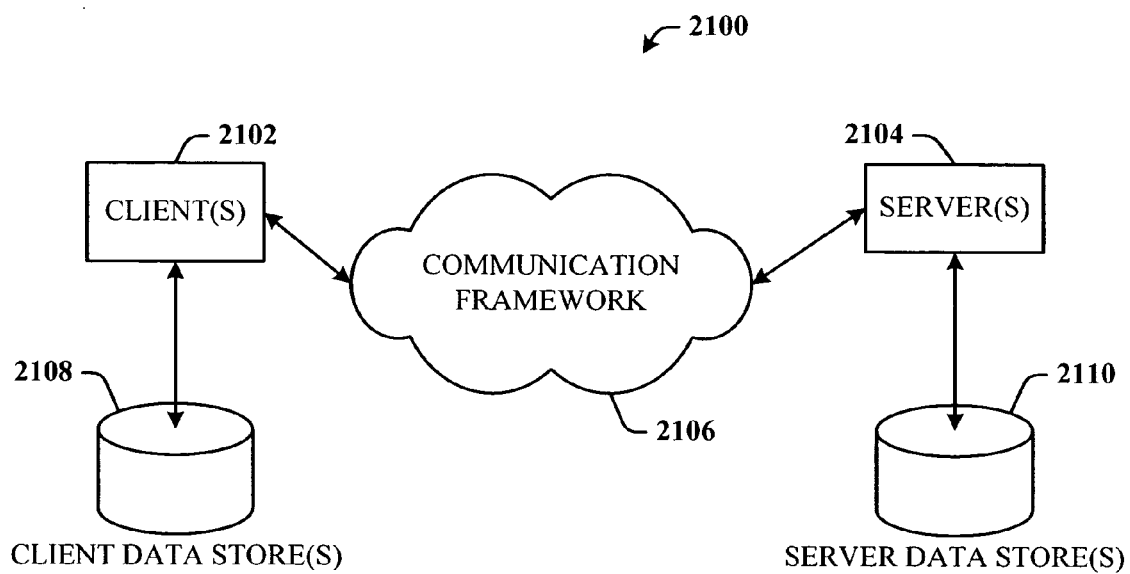
FIG. 21 illustrates a schematic block diagram of an exemplary computing environment in accordance with the present invention.

Referring now to FIG. 21, there is illustrated a schematic block diagram of an exemplary computing environment 2100 in accordance with the present invention. The system 2100 includes one or more client(s) 2102. The client(s) 2102 can be hardware and/or software (e.g., threads, processes, computing devices). The client(s) 2102 can house cookie(s) and/or associated contextual information by employing the present invention, for example. The system 2200 also includes one or more server(s) 2104. The server(s) 2104 can also be hardware and/or software (e.g., threads, processes, computing devices). The servers 2104 can house threads to perform transformations by employing the present invention, for example. One possible communication between a client 2102 and a server 2104 can be in the form of a data packet adapted to be transmitted between two or more computer processes. The data packet may include a cookie and/or associated contextual information, for example. The system 2100 includes a communication framework 2106 (e.g., a global communication network such as the Internet) that can be employed to facilitate communications between the client(s) 2102 and the server(s) 2104.

Communications can be facilitated via a wired (including optical fiber) and/or wireless technology. The client(s) 2102 are operatively connected to one or more client data store(s) 2108 that can be employed to store information local to the client(s) 2102 (e.g., cookie(s) and/or associated contextual information). Similarly, the server(s) 2104 are operatively connected to one or more server data store(s) 2110 that can be employed to store information local to the servers 2104.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable storage medium having stored thereon rules creation framework that facilitates data management by an end-user who is not a trained software developer, the rules creation framework comprising:

a first application program interface for receiving decision point objects from an application, the decision point objects comprising both synchronous and asynchronous decision point objects, wherein each decision point object contains one or more rules to be applied to data on a computer system on which the rules creation framework is running to produce a set of results, wherein the one or more rules are provided to the application by a user to customize the functionality of the application, wherein if a decision point object is synchronous, the application, upon reaching the decision point and submitting the synchronous decision point object to the first application program interface, waits for the set of results before proceeding with execution, whereas if a decision point object is asynchronous, the application, upon reaching the decision point and submitting the asynchronous decision point object to the first application program interface, proceeds with execution without waiting for the set of results;

a second application program interface for receiving rule logic objects, wherein each rule logic object contains one or more rules to be applied to data on the computer system wherein the one or more rules of each rule logic object customize the functionality of the operating system running on the computer system; and a user interface component through which a user specifies the one or more rules to be included within each rule logic object for customizing the functionality of the operating system.

2. The medium of claim 1, wherein the one or more rules of the decision point objects and the rule logic objects are used by the rules creation framework to define virtual collections of the data in the computer system.

3. The medium of claim 1, further comprising one or more trigger components that sets items and collections of items dynamically active as a function of trigger logic.

4. The medium of claim 1, further comprising a resolution component that resolves a conflict between rules.

5. The medium of claim 4, the resolution component resolves the rules conflict by at least one of end-user rule prioritization or a predefined resolution policy.

6. A computer implemented rules-based system that facilitates file system management by an end-user who is not a trained software developer, comprising:

a processor; and memory storing a rules creation framework comprising:

a first application program interface for receiving decision point objects from an application, the decision point objects comprising both synchronous and asynchronous decision point objects, wherein each decision point object contains one or more rules to be applied to data on a computer system on which the rules creation framework is running to produce a set of results, wherein the one or more rules are provided to the application by a user to customize the functionality of the application, wherein if a decision point object is synchronous, the application, upon reaching the decision point and submitting the synchronous decision point object to the first application program interface, waits for the set of results before proceeding with execution, whereas if a decision point object is asynchronous, the application, upon reaching the decision point and submitting the asynchronous decision point object to the first application program interface, proceeds with execution without waiting for the set of results;

a second application program interface for receiving rule logic objects, wherein each rule logic object contains one or more rules to be applied to data on the computer system wherein the one or more rules of each rule logic object customize the functionality of the operating system running on the computer system; and a user interface component through which a user specifies the one or more rules to be included within each rule logic object for customizing the functionality of the operating system.

7. The system of claim 6, further comprising one or more trigger components that set items and collections of items dynamically active as a function of trigger logic.

8. The system of claim 6, further comprising a resolution component that resolves a conflict between a plurality of the rules by employing at least one of end-user rule prioritization and a predefined resolution policy.

* * * * *